(12) United States Patent
Lee et al.

(10) Patent No.: US 11,483,039 B2
(45) Date of Patent: Oct. 25, 2022

(54) METHOD AND APPARATUS FOR DETECTING SIGNAL WITH QUANTUM COMPUTING IN MIMO SYSTEM

(71) Applicants: Samsung Electronics Co., Ltd., Suwon-si (KR); Korean University Research and Business Foundation, Seoul (KR)

(72) Inventors: Kwonjong Lee, Suwon-si (KR); Kwangseok Noh, Seoul (KR); Jeonghoon Park, Seoul (KR); Jun Heo, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 0 days.

(21) Appl. No.: 17/389,256

(22) Filed: Jul. 29, 2021

(65) Prior Publication Data

US 2022/0038144 A1     Feb. 3, 2022

(30) Foreign Application Priority Data

Jul. 30, 2020   (KR) ........................ 10-2020-0095409
Mar. 29, 2021  (KR) ........................ 10-2021-0040722

(51) Int. Cl.
*H04B 7/02*        (2018.01)
*H04B 7/0456*      (2017.01)

(52) U.S. Cl.
CPC .................................. *H04B 7/0456* (2013.01)

(58) Field of Classification Search
CPC . H04B 7/0456; H04B 7/0413; H04L 27/0008; H04L 25/02

USPC ......................................................... 375/267
See application file for complete search history.

(56) References Cited

U.S. PATENT DOCUMENTS

| | | | |
|---|---|---|---|
| 2005/0015422 A1 | 1/2005 | Kohn et al. | |
| 2014/0140425 A1* | 5/2014 | Zhang | H04B 7/0854 375/267 |
| 2016/0065257 A1* | 3/2016 | Fujii | H04B 7/0617 375/267 |

FOREIGN PATENT DOCUMENTS

| | | | | |
|---|---|---|---|---|
| CN | 106712903 | * | 5/2017 | ........... H04L 1/0047 |
| KR | 10-2005-0105469 A | | 11/2005 | |

OTHER PUBLICATIONS

Lee et al., "Hybrid quantum linear equation algorithm and its experimental test on IBM Quantum Experience", Scientific Reports, Mar. 18, 2019, 12 pages.

(Continued)

*Primary Examiner* — Helene E Tayong

(57) ABSTRACT

A method of detecting a signal in a wireless communication system supporting multiple-input multiple-output (MIMO) is provided. The method includes obtaining a MIMO channel matrix between a transmission end and a reception end and a reception vector received by the reception end, identifying a modulation scheme of the transmission end, applying a preset equation modification scheme to the MIMO channel matrix and the reception vector according to the identified modulation scheme, and detecting a transmission vector of the transmission end by performing quantum calculation on the modified MIMO channel matrix and the modified reception vector.

20 Claims, 12 Drawing Sheets

(56) References Cited

OTHER PUBLICATIONS

Harrow et al., "Quantum algorithm for linear systems of equations", Sep. 30, 2009, 15 pages.

* cited by examiner

METHOD AND APPARATUS FOR DETECTING SIGNAL WITH QUANTUM COMPUTING IN MIMO SYSTEM

CROSS-REFERENCE TO RELATED APPLICATIONS

This application is based on and claims priority under 35 U.S.C. 119 to Korean Patent Application No. 10-2020-0095409 filed on Jul. 30, 2020, and Korean Patent Application No. 10-2021-0040722 filed on Mar. 29, 2021 in the Korean Intellectual Property Office, the disclosures of which are herein incorporated by reference in their entirety.

BACKGROUND

1. Field

The present disclosure relates to a method for detecting a signal by using quantum computing in a multiple-input multiple-output (MIMO) system.

2. Description of Related Art

In order to meet the demand for wireless data traffic soaring since the 4G communication system came to the market, there are ongoing efforts to develop enhanced 5G communication systems or pre-5G communication systems. For the reasons, the 5G communication system or pre-5G communication system is called the beyond 4G network communication system or post LTE system.

For higher data transmission rates, 5G communication systems have been considered for implementation on ultra-high frequency bands (mmWave), such as, e.g., 70 GHz. To mitigate path loss on the ultra-high frequency band and increase the reach of radio waves, the following techniques have been considered for 5G communication systems: beamforming, massive multi-input multi-output (MIMO), full dimensional MIMO (FD-MIMO), array antenna, analog beamforming, and/or large scale antenna, etc.

Also being developed are various technologies for the 5G communication system to have an enhanced network, such as evolved or advanced small cell, cloud radio access network (cloud RAN), ultra-dense network, device-to-device (D2D) communication, wireless backhaul, moving network, cooperative communication, coordinated multi-point (CoMP), and/or interference cancellation, etc.

There are also other various schemes under development for the 5G system including, e.g., hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and/or sparse code multiple access (SCMA), etc., which are advanced access schemes.

In addition, there is a discussion about which technology will lead the next generation wireless communication after the 5G communication system, and this is called the 6th generation (6G). Major services in the 6G communication systems may include truly immersive XR, high-fidelity mobile hologram, and/or digital replica, etc. For this, candidate technologies, such as, a technology for utilizing a terabyte Hz (THz) frequency band, a new antenna technology for improving a high-frequency band coverage, an innovative duplex technology, an innovative network topology such as flexible network configuration, satellite utilization, and/or etc., a frequency sharing topology for increasing frequency utilization efficiency, and/or a communication topology in which AI is applied, etc., are being discussed. It is being discussed that the 6G communication systems will have a denser network than the 5G communication systems.

A MIMO technology is a technology for spatially multiplexing information to transmit the multiplexed information corresponding to an instantaneous channel occurred at a plurality of transmission/reception antennas. In MIMO transmission, a plurality of data streams may be spatially multiplexed in one time and frequency resource and then transmitted, so a data transmission rate may be increased several times as compared to conventional non-MIMO transmission. In addition, channel fading is suppressed in base stations and user equipments by using a multi-antenna technology, so a channel capacity, a network coverage area, and spectrum utilization may be greatly improved.

FIG. 1 is a block diagram illustrating a signal transmission/reception process in a general MIMO system. Here, the MIMO system means a wireless communication system supporting a MIMO transmission technology.

Referring to the non-limiting example FIG. 1, a general MIMO system 100 includes a transmission end 101, a MIMO channel 102, and a reception end 103.

If the transmission end 101 in the MIMO system 100 transmits a transmission vector, the transmission vector is passed through the MIMO channel 102, and then the reception end 103 obtains the reception vector. The reception end 103 detects an input vector of the MIMO channel 102, i.e., the transmission vector, from a MIMO channel matrix given for the MIMO channel 102 and the reception vector.

Specifically, a process of detecting the transmission vector at the reception end 103 in the MIMO system 100 is to find a solution of a linear equation Ax=Y. That is, in order to detect the transmission vector at the reception end 103, the linear equation consisting of the MIMO channel matrix, the reception vector, and the transmission vector needs to be solved. In a system model in FIG. 1, a matrix A denotes a MIMO channel matrix of size N×N, $x=(x_1 \ldots x_N)^T$ denotes a transmission vector composed of a column vector of length N, and $y=(y_1 \ldots y_N)^T$ denotes a reception vector composed of a column vector of length N. Here, N denotes the number of antennas of the transmission end 101 and the reception end 103.

Quantum computing may be applied to obtain a solution of a linear equation for detecting an input vector of a MIMO channel in a MIMO system.

The quantum computing is a new calculation scheme which is based on a quantum state, and differs from existing computers which physical transistors and logical gates to create and process digital information. A quantum algorithm refers to a method of configuring a specific quantum circuit to solve a given problem in a quantum computer. A quantum state used in the quantum computing is a vector which exists in a complex space in terms of mathematics, superposition of information is possible in the quantum state, so quantum computing enables faster calculation and processing than existing computing. For example, quantum computing can solve a prime factorization problem, which is a base problem of a current commercially used Rivest-Shamir-Adleman (RSA) cryptography, exponentially faster than existing digital algorithms.

The following schemes exist for solving a linear equation in a quantum computing scheme.

A Harrow-Hassidim-Lloyd algorithm (hereinafter, referred to as "HHL algorithm") is a quantum algorithm for solving a linear equation in a quantum calculation. The HHL algorithm solves a problem faster than previously known digital algorithms by using a characteristic of a quantum state. In particular, if a matrix of a given linear equation is close to a sparse matrix, the HHL algorithm can solve the linear equation exponentially faster than a corresponding digital algorithm. However, a solution of the linear equation solved by the HHL algorithm exists in a quantum state rather than as a digital value, it is not possible to know what state it is, and digital information which may be used or handled by a user may be obtained only through a process called quantum measurement.

Quantum measurement is a process of extracting digital information from a quantum state to obtain information which is required because quantum computing uses the quantum state.

Due to a characteristic of quantum mechanics in a quantum measurement process, quantum states which are not vertical to each other may not be completely distinguished and a computational error can occur.

Despite the fast performance of the HHL algorithm, which is a quantum algorithm which solves a linear equation, the HHL algorithm itself outputs a quantum state as a final state, so there is an inevitable error in the quantum measurement process, and an extraction technology to remove the inevitable error is required.

Meanwhile, existing method for extracting digital information without error for the HHL algorithm, include quantum amplitude estimation (QAE) technology.

The QAE technology is an algorithm which finds a magnitude of a probability amplitude value of a quantum state which is desired to obtain.

In a quantum state, it is possible that two or more states are superposed, and a probability of obtaining a specific state by quantum measurement for a given quantum state is equal to a probability amplitude value of the given quantum state. Therefore, if digital information desired to be obtained is related to a probability amplitude value, the desired information may be extracted by applying the QAE technology.

The existing method for extracting digital information without error for the HHL algorithm by using QAE technology solves an equation obtained through the HHL algorithm. At this time, each component of the obtained solution is regarded as a value related to a probability amplitude of a certain quantum state, for which a probability amplitude value for each component is obtained through an additional QAE process, and the obtained probability amplitude value is determined as each component.

However, the existing method only extracts amplitude information from each component in a solution of an equation, and does not extract phase information from each component in the solution of the equation.

For this reason, there is a limitation in applying the existing method which uses the QAE technology to a MIMO system to obtain an input vector of a MIMO channel.

In addition, the existing method goes through an additional process which uses the QAE algorithm to extract each component in a solution of an equation, so the existing method increases the total amount of calculation.

So, there is a need for a method capable of extracting both magnitude information and phase information of a solution of an equation applicable to a MIMO system and which does not increase the amount of calculation to be performed.

SUMMARY

Accordingly, embodiments according to the present disclosure are designed to solve at least the aforementioned limitations and problems in the related art and provide at least advantages to be described below.

An embodiment of the present disclosure provides a method and apparatus for solving a process of solving a linear equation performed in a stage of detecting a signal transmitted in a MIMO system by applying a quantum algorithm.

An embodiment of the present disclosure provides a method and apparatus for error-free extraction of an output value existing as a quantum state as digital information upon obtaining a solution of a linear equation by applying a quantum algorithm.

An embodiment of the present disclosure provides a method and an apparatus for extracting digital information without requiring additional processing upon extracting the digital information from a solution of a linear equation obtained by applying a quantum algorithm.

An embodiment of the present disclosure provides a method and apparatus whose application range is wider than an application range of an existing method upon extracting digital information, without an error, from a solution of a linear equation obtained by applying a quantum algorithm.

An embodiment of the present disclosure provides a method and apparatus for decreasing calculation complexity (compared to existing methods) upon extracting digital information, without an error, from a solution of a linear equation obtained by applying a quantum algorithm.

According to an embodiment of the present disclosure, a method of detecting a signal in a wireless communication system supporting multiple-input multiple-output (MIMO) is provided. The method comprises obtaining a MIMO channel matrix between a transmission end and a reception end and a reception vector received by the reception end, identifying a modulation scheme of the transmission end, applying a preset equation modification scheme to the MIMO channel matrix and the reception vector according to the identified modulation scheme, and detecting a transmission vector of the transmission end by performing quantum calculation on the modified MIMO channel matrix and the modified reception vector.

According to an embodiment of the present disclosure, a quantum calculation center in a wireless communication system supporting MIMO is provided. The quantum calculation center comprises a network interface configured to obtain a MIMO channel matrix between a transmission end and a reception end and a reception vector received by the reception end, and a processor configured to identify a modulation scheme of the transmission end, apply a preset equation modification scheme to the MIMO channel matrix and the reception vector according to the identified modulation scheme, and detect a transmission vector of the transmission end by performing quantum calculation on the modified MIMO channel matrix and the modified reception vector.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
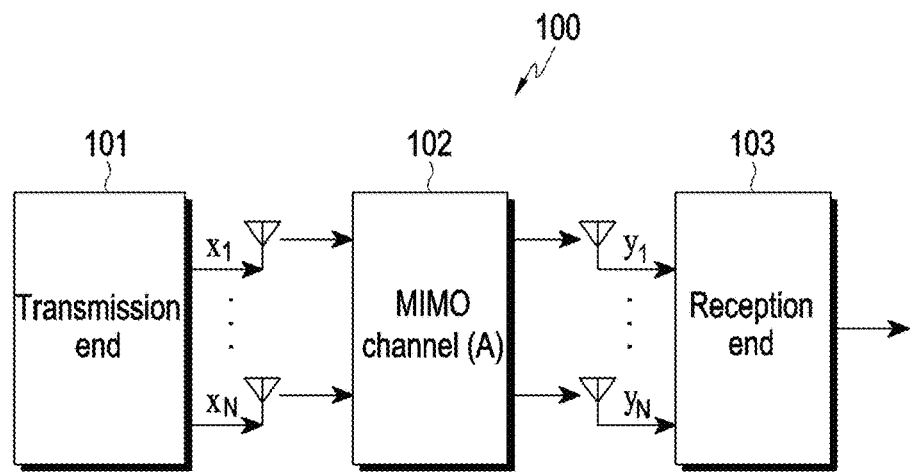
FIG. 1 illustrates, in block diagram format, an example of a signal transmission/reception process in a multiple-input multiple-output (MIMO) system according to various embodiments of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, an embodiment of the disclosure will be described in detail with reference to the accompanying drawings. In describing embodiments, a detailed description of related functions or configurations will be omitted when it is determined that the detailed description thereof may unnecessarily obscure the subject matter of the disclosure. The terms as described below are defined in consideration of the functions in the embodiments, and the meaning of the terms may vary according to the intention of a user or operator, convention, or the like. Therefore, the definitions of the terms should be made based on the contents throughout the specification.

In the present disclosure, various changes may be made and various embodiments may be provided, and specific embodiments will be described in detail by exemplifying them in the drawings. However, this is not intended to limit the present disclosure to a specific embodiment, it should be understood to include all changes, equivalents, and substitutes included in the spirit and scope of the present disclosure.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the inventive concept. The term "and/ or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM) or digital video disc (DVD)-ROM), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a block or a program) of the present disclosure may include a single entity or multiple entities. According to various embodiments, one or more of the above-described components may be omitted, or one or more other components may be added. Alternatively or additionally, a plurality of components (e.g., blocks or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to the present disclosure, an electronic device may provide a channel for a wireless communication with a terminal. The electronic device may mean a base station, an access network (AN), a radio access network (RAN), an eNB, an eNodeB, a $5^{th}$ generation (5G) node, a transmission/reception point (TRP), or a $5^{th}$ generation NodeB (5gNB), and/or the like. For convenience, embodiments of the present disclosure will be described by illustrating the electronic device as the base station. The terminal may mean a user equipment (UE), a mobile station, a subscriber station, a remote terminal, a wireless terminal, or a user device, and/or the like which communicate with the base station via the wireless communication.

According to the present disclosure, a multiple-input multiple-output (MIMO) system may mean, for example, various wireless communication systems which support a MIMO transmission technology which is a multi-antenna technology such as a long-term evolution (LTE) system, a long-term evolution-advanced (LTE-A) system, and an LTE-A pro system which are proposed in a 3rd generation partnership project (3GPP), or a 5G system, and/or the like.

According to the present disclosure, the terms 'transmission end' and 'reception end' may correspond to a terminal and a base station, respectively, or may correspond to the base station and the terminal, respectively, and the terminal and the base station correspond to the aforementioned terminal and base station.

Unless otherwise defined in the present disclosure, all terms including technical or scientific terms used herein have the same meaning as commonly understood by a person of ordinary skill in a technical field to which the present disclosure belongs. Terms as defined in a commonly used dictionary should be interpreted as having a meaning consistent with the meaning in the context of the related technology, and unless explicitly defined in an embodiments of the present invention, the terms are not to be interpreted in an ideal or excessively formal meaning.

At least one embodiment of the present disclosure includes modifying a MIMO channel matrix and a reception vector, quantizing the modified MIMO channel matrix and reception vector and applying a quantization algorithm to the quantized MIMO channel matrix and reception vector, and digitalizing (i.e., quantum measuring) a result of the application of the quantization algorithm to obtain an input vector of a MIMO channel, i.e., a transmission vector of a transmission end in order to obtain a solution of a linear equation for estimating the input vector of the MIMO channel.

Here, the modification of the MIMO channel matrix and the reception vector is applied according to a modulation scheme applied to transmission of the transmission vector at the transmission end.

Further, depending on the modulation scheme, information related to the solution of the linear equation is first obtained before the MIMO channel matrix and the reception vector are modified, and the modification of the MIMO channel matrix and the reception vector is applied according to this prior information.

Hereinafter, embodiments of the present disclosure will be described in detail based on the above-described basic concept.

Figure 2:
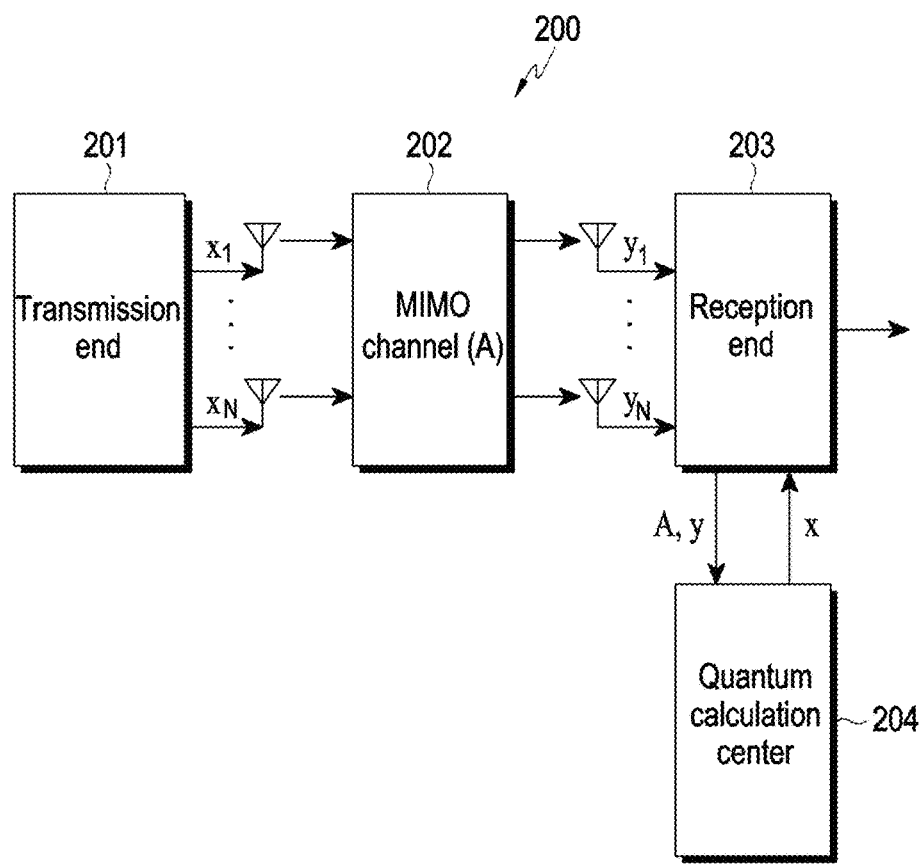
FIG. 2 illustrates, in block diagram format, an example of a signal transmission/reception process in a MIMO system according to some embodiments of the present disclosure.

FIG. 2 illustrates, in block diagram format, an example of a signal transmission/reception process in a MIMO system 200 according to some embodiments of the present disclosure.

Referring to the illustrative example of FIG. 2, the MIMO system 200 includes a transmission end 201, a MIMO channel 202, a reception end 203, and a quantum calculation center 204. Here, the quantum calculation center 204 may exist inside or outside the reception end 203. If the quantum calculation center 204 exists inside the reception end 203, an device included in the reception end 203 may perform one or more roles of the quantum calculation center 204.

Continuing with reference to FIG. 2, if the transmission end 201 in the MIMO system 200 transmits a transmission vector, the transmission vector passes through the MIMO channel 202 to reach the reception end 203, and the reception end 203 obtains a reception vector from a received signal. The reception end 203 transmits a given (or estimated) MIMO channel matrix for the MIMO channel 202 and reception vector to the quantum calculation center 204. The quantum calculation center 204 estimates an input vector of the MIMO channel 202, i.e., the transmission vector transmitted by the transmission end 201, from the MIMO channel matrix and the receiving vector, and transmits the estimated transmission vector to the reception end 203.

In the MIMO system 200, a process of estimating the transmission vector in the quantum calculation center 204 is performed to obtain a solution of a linear equation Ax=y by applying a quantum algorithm. Here, a matrix A denotes a MIMO channel matrix of size N×N of the MIMO channel 202, $x=(x_1 \ldots x_N)^T$, which is a column vector of length N, denotes a transmission vector, and $y=(y_1 \ldots y_N)^T$, which is a column vector of length N, denotes a reception vector. Here, N denotes the number of antennas of the transmission end 201 and the reception end 203.

Meanwhile, in some embodiments according to the present disclosure, a matrix A of a linear equation is assumed to be an arbitrary matrix of size N×N.

Figure 3:
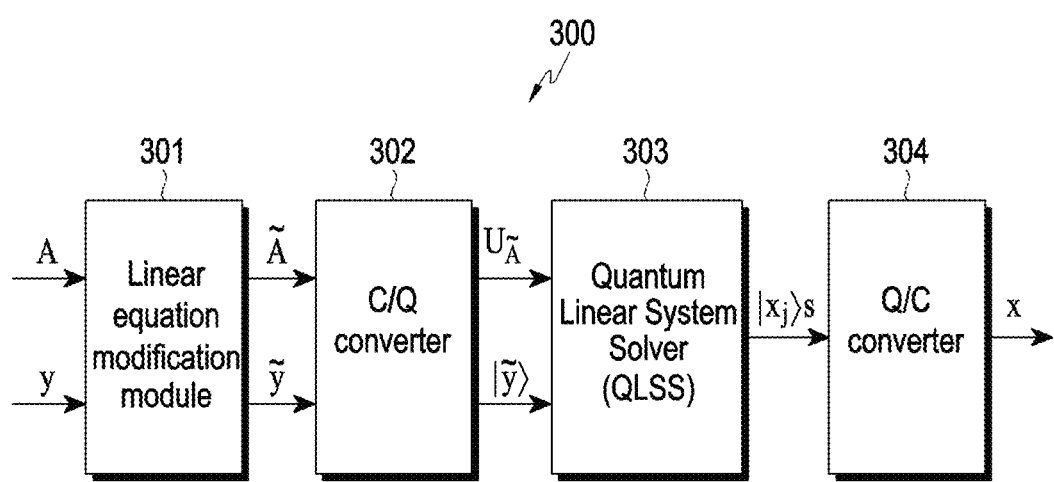
FIG. 3 illustrates, in block diagram format, an example of a quantum calculation center according to various embodiments of the present disclosure.

FIG. 3 illustrates, in block diagram format, an example of a quantum calculation center 300 according to various embodiments of the present disclosure.

Referring to the illustrative example of FIG. 3, the quantum calculation center 300 includes a linear equation modification module 301, a digital-quantum converter (or a classical-quantum converter (C/Q converter)) 302, a quantum linear system solver (QLSS) 303, and a quantum-digital converter (or a quantum-classical converter (Q/C converter)) 304. In the illustrative example FIG. 3, one of each of QLSS 303 and Q/C converter 304 are shown in the figure. However, embodiments according to the present disclosure are not limited by the figure, and embodiments with two or more of QLSS 303 and Q/C converter 304 are possible and within the contemplated scope of the present disclosure. A plurality of QLSSs and a plurality of Q/C converters may be connected in parallel.

Continuing with reference to FIG. 3, the linear equation modification module 301 receives a MIMO channel matrix and a reception vector from a reception end, modifies the MIMO channel matrix and the reception vector with a scheme according to an embodiment of the present disclosure, and transfers the modified MIMO channel matrix and reception vector to the C/Q converter 302. The C/Q converter 302 converts the modified MIMO channel matrix and reception vector which are information in a digital state (hereinafter, it will be referred to as "digital information") into information in a quantum state (hereinafter, it will be referred to as "quantum information") for applying a quantum algorithm. The C/Q converter 302 transfers the quantum information of the MIMO channel matrix and the reception vector to the QLSS 303.

Meanwhile, the C/Q converter 302 is a structure common to all quantum computing devices, and a detailed description of the C/Q converter 302 is for quantum computing implementation itself, which is beyond the scope of the present disclosure, so a detailed description thereof will be omitted.

Upon receiving the quantum information of the MIMO channel matrix and the reception vector, the QLSS 303 obtains quantum information of the transmission vector by using a quantum algorithm. Here, the quantum algorithm used by the QLSS 303 may include a Harrow-Hassidim-Lloyd (HHL) algorithm. The QLSS 303 transfers the quantum information of the transmission vector to the Q/C converter 304.

Upon receiving the quantum information of the transmission vector, the Q/C converter 304 obtains digital information for the quantum information of the transmission vector through quantum measurement. The digital information is the transmission vector. In addition, the Q/C converter 304 transfers, to the reception end, the transmission vector, which is an input vector of the MIMO channel.

Figure 4:
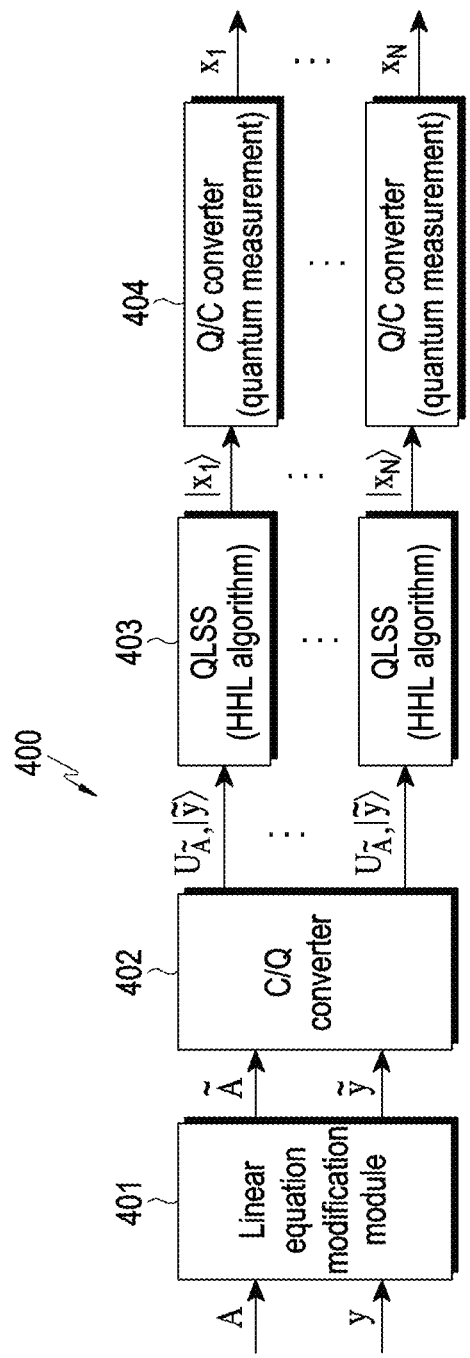
FIG. 4 illustrates, in block diagram format, an example of a quantum calculation center where a binary phase shift keying (BPSK) modulation scheme is used as a modulation scheme of a transmission end, according to certain embodiments of the present disclosure.
Figure 5:
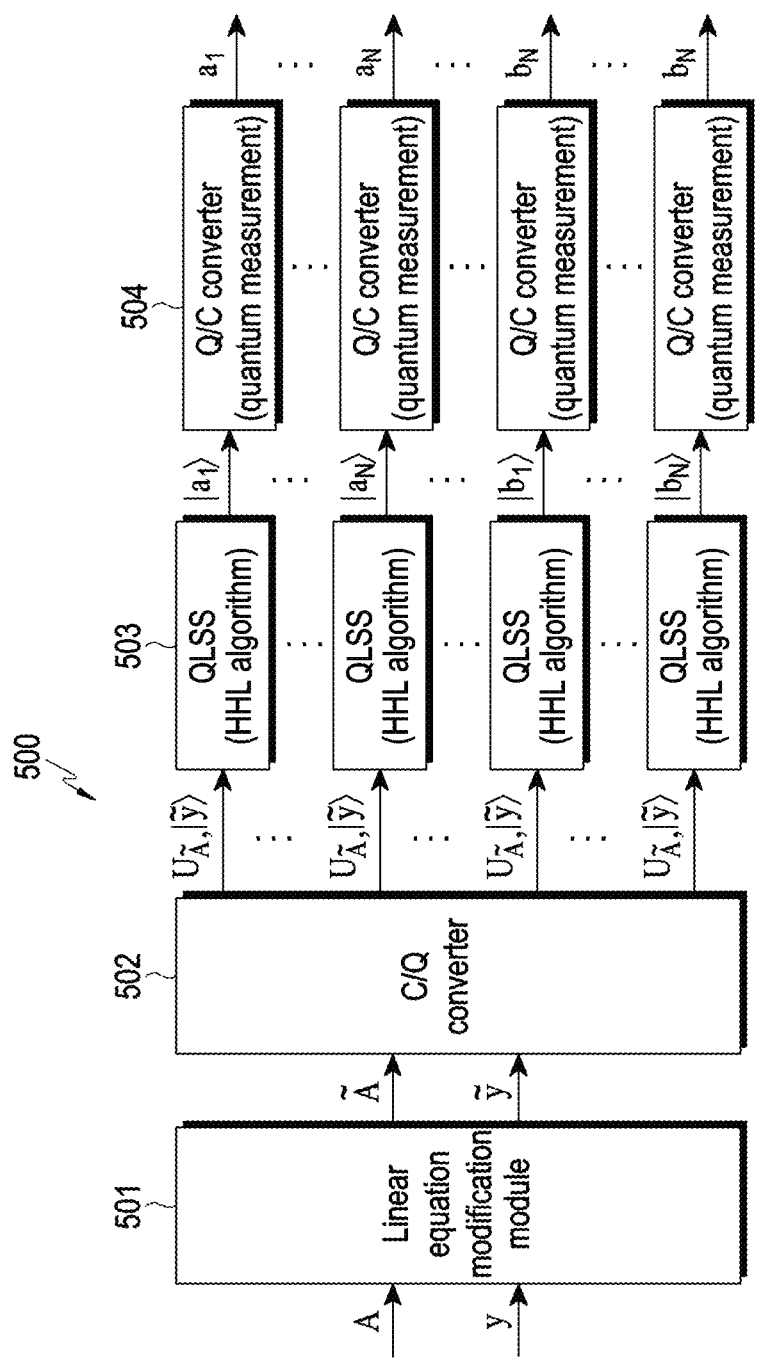
FIG. 5 illustrates, in block diagram format, an example of a quantum calculation center where a quadrature phase shift keying (QPSK) modulation scheme is used as a modulation scheme of a transmission end, according to various embodiments of the present disclosure.
Figure 6:
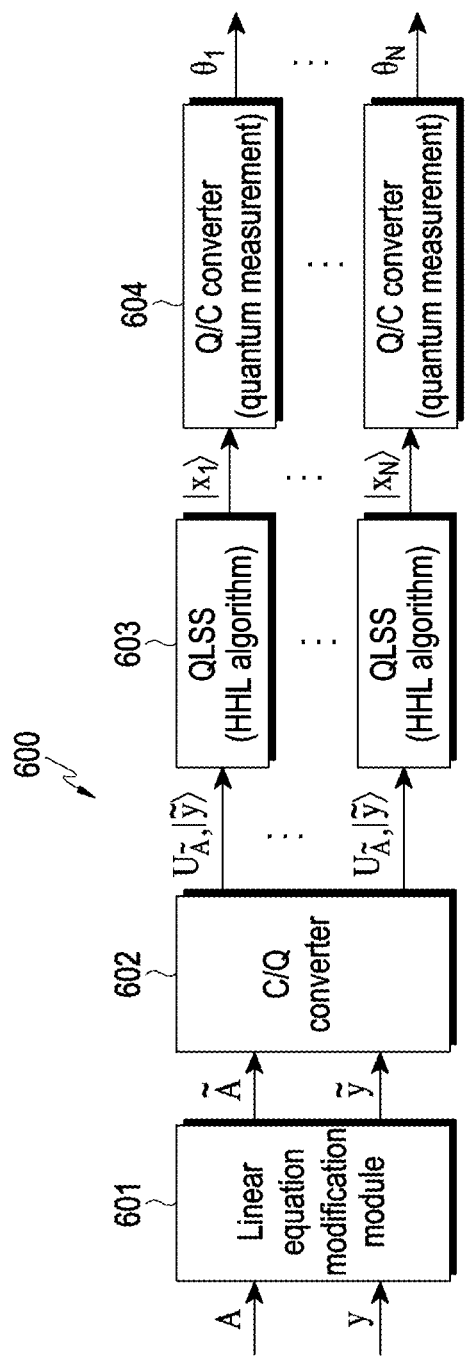
FIG. 6 illustrates, in block diagram format, an example of a quantum calculation center where a M-ary phase shift keying (MPSK) modulation scheme is used as a modulation scheme of a transmission end, according to some embodiments of the present disclosure.

Next, a detailed structure of a quantum calculation center if a modulation scheme of a transmission end is a binary phase shift keying (BPSK) modulation scheme, a detailed structure of the quantum calculation center if the modulation scheme of the transmission end is a quadrature phase shift keying (QPSK) modulation scheme, and a detailed structure of the quantum calculation center if the modulation scheme of the transmission end is an M-ary phase shift keying (MPSK) modulation scheme will be described with reference to FIGS. 4 through 6. Here, M denotes a power of 2 which is equal to or greater than 2.

FIG. 4 illustrates, in block diagram format, an example of a quantum calculation center 400 in embodiments where a BPSK modulation scheme is used as a modulation scheme of a transmission end, according to various embodiments of the present disclosure. That is, FIG. 4 is a block diagram which further illustrates structures combinations of structures of the quantum calculation center 300 illustrated in FIG. 3 in embodiments where a transmission vector of the transmission end is a BPSK signal.

Referring to FIG. 4, a quantum calculation center 400 includes a linear equation modification module 401, a C/Q converter 402, a QLSS 403, and a Q/C converter 404. Here, the linear equation modification module 401, the C/Q converter 402, the QLSS 403, and the Q/C converter 404 in the quantum calculation center 400 may correspond to, or perform roles of a linear equation modification module 301, a C/Q converter 302, a QLSS 303, and a Q/C converter 304 in a quantum calculation center 300 in FIG. 3, respectively.

A transmission vector $x=(x_1 \ldots x_N)^T$ of the transmission end in FIG. 4 is the BPSK signal, so each term $x_j$ has a binary value which satisfies $x_j=\pm 1$. Accordingly, N QLSSs 403 and N Q/C converters 404 are configured in parallel in order for the quantum calculation center 400 in FIG. 4 to obtain N solutions for each term $x_j$ of the transmission vector $x=(x_1 \ldots x_N)^T$.

FIG. 5 illustrates, in block diagram format, an example of a quantum calculation center 500 in embodiments where a QPSK modulation scheme is used as a modulation scheme of a transmission end, according to various embodiments of the present disclosure. That is, FIG. 5 is a block diagram which illustrates in detail each structure and/or combinations of structures illustrated in FIG. 3 if a transmission vector of the transmission end is a QPSK signal.

Referring to the illustrative example of FIG. 5, the quantum calculation center 500 includes a linear equation modification module 501, a C/Q converter 502, a QLSS 503, and a Q/C converter 504. Here, the linear equation modification module 501, the C/Q converter 502, the QLSS 503, and the Q/C converter 504 in the quantum calculation center 500 may correspond to, or perform roles of a linear equation modification module 301, a C/Q converter 302, a QLSS 303, and a Q/C converter 304 in a quantum calculation center 300 in FIG. 3, respectively.

A transmission vector $x=(x_1 \ldots x_N)^T$ of the transmission end in FIG. 5 is the QPSK signal, and each term may have values expressed as $x_j=1+i, 1-i, -1+i, -1-i$. So, each term $x_j$ may be expressed as $x_j=a_j+ib_j$. Here, $a_j$ has a binary value which satisfies $a_j=\pm 1$ and $b_j$ has a binary value which satisfies $b_j=\pm 1$. Accordingly, N QLSSs 503 and N Q/C converters 504 for $a_j$ are configured in parallel, and N QLSSs 503 and N Q/C converters 504 for $b_j$ are configured in parallel, that is, 2N QLSSs 503 and 2N Q/C converters 504 are configured in parallel, in order for the quantum calculation center 500 in FIG. 5 to obtain N solutions for each of $a_j$ and $b_j$ in each term $x_j$ of the transmission vector $x=(x_1 \ldots x_N)^T$.

FIG. 6 illustrates, in block diagram format, an example of a quantum calculation center in embodiments where an MPSK modulation scheme is used as a modulation scheme of a transmission end, according to certain embodiments of the present disclosure. That is, FIG. 6 is a block diagram which illustrates structures or combinations of structures which may be incorporated into a quantum calculation center, such illustrated in FIG. 3, in which a transmission vector of the transmission end is an MPSK signal.

Referring to the non-limiting example of FIG. 6, according to some embodiments, a quantum calculation center 600 includes a linear equation modification module 601, a C/Q converter 602, a QLSS 603, and a Q/C converter 604. Here, the linear equation modification module 601, the C/Q converter 602, the QLSS 603, and the Q/C converter 604 in the quantum calculation center 600 may correspond to, or perform roles of a linear equation modification module 301, a C/Q converter 302, a QLSS 303, and a Q/C converter 304 in a quantum calculation center 300 in FIG. 3, respectively.

A transmission vector $x=(x_1 \ldots x_N)^T$ of the transmission end in FIG. 6 is the MPSK signal, and each term $x_j$ has an M-ary value which satisfies $$x_j = e^{i\left(\frac{2\pi}{M}k\right)}$$

for k included in $\{0, 1, \ldots, M-1\}$. Accordingly, N QLSSs 603 and N Q/C converters 604 are configured in parallel in order for the quantum calculation center 600 in FIG. 6 to obtain N solutions for each term $x_j$ in the transmission vector $x=(x_1 \ldots x_N)^T$.

Figure 7:
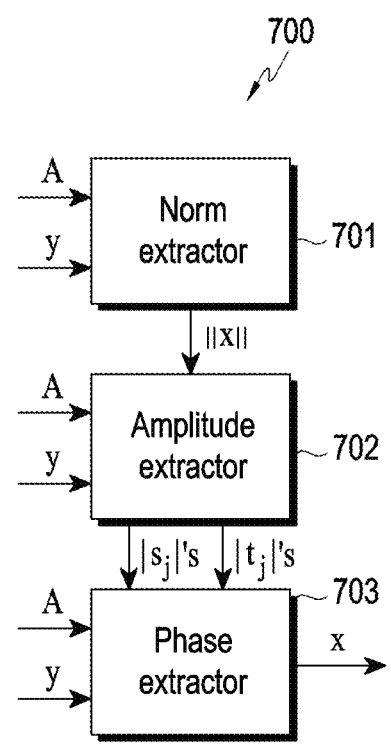
FIG. 7 illustrates, in block diagram format, an example of a quantum calculation center where a quadrature amplitude modulation (QAM) modulation scheme is used as a modulation scheme of a transmission end, according to certain embodiments of the present disclosure.

FIG. 7 illustrates, in block diagram format, an example of a quantum calculation center in embodiments where a quadrature amplitude modulation (QAM) modulation scheme is used as a modulation scheme of a transmission end, according to various embodiments of the present disclosure.

Referring to the illustrative example of FIG. 7, a quantum calculation center 700 includes an extractor (hereinafter, referred to as "norm extractor") 701 for extracting a magnitude of a solution, an extractor (hereinafter, referred to as "amplitude extractor") 702 for extracting an individual amplitude of the solution, and an extractor (hereinafter, referred to as "phase extractor") 703 for extracting an individual phase of the solution. That is, the quantum calculation center 700 includes the norm extractor 701 for obtaining prior information for obtaining a transmission vector, the amplitude extractor 702 for obtaining an individual amplitude of the transmission vector, and the phase extractor 703 for obtaining an individual phase of the transmission vector.

Continuing with reference to the explanatory example of FIG. 7, the norm extractor 701 receives a MIMO channel matrix and a reception vector from a reception end, and transfers, to the amplitude extractor 702, a magnitude value of a solution which is prior information for obtaining a transmission vector. The amplitude extractor 702 receives the MIMO channel matrix and the reception vector from the reception end, and transfers, to the phase extractor 703, an individual amplitude value of the solution which is obtained based on the magnitude value of the solution transferred from the norm extractor 701. The phase extractor 703 receives the MIMO channel matrix and the reception vector from the reception end, and obtains a value of the transmission vector by obtaining an individual phase value of the solution based on the individual amplitude value of the solution transferred from the amplitude extractor 702. The phase extractor 703 transfers, to the reception end, the obtained transmission vector which is an input vector of a MIMO channel.

Figure 8:
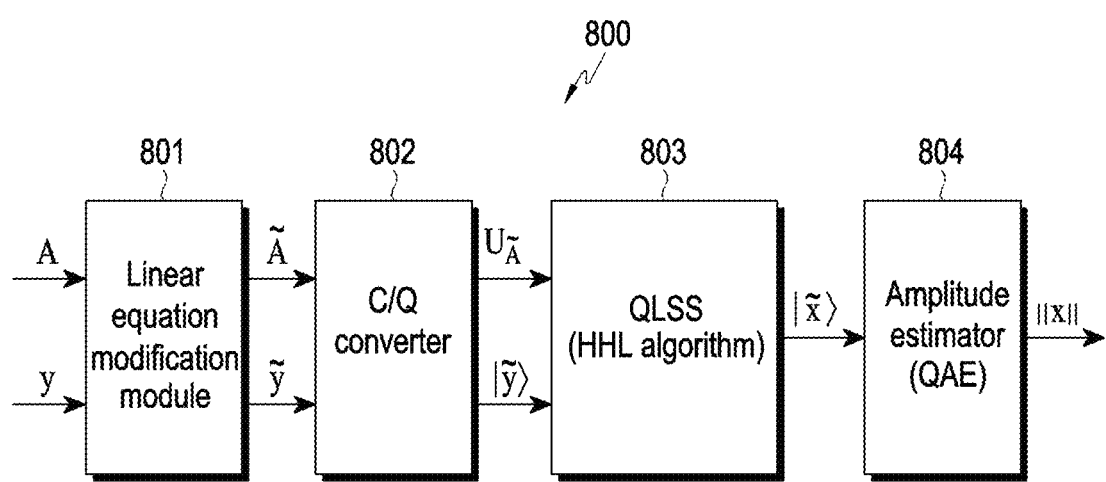
FIG. 8 illustrates, in block diagram format, an example of a structure of a norm extractor of a calculation center (such as shown in FIG. 7) according to certain embodiments of the present disclosure.

FIG. 8 illustrates, in block diagram format, an example of a structure of a norm extractor for use in a quantum calculation center (for example, calculation center 700 in FIG. 7) according to various embodiments of the present disclosure.

Referring to FIG. 8, in some embodiments, a norm extractor 800 includes a linear equation modification module 801, a C/Q converter 802, a QLSS 803, and an amplitude estimator 804. Here, the linear equation modification module 801, the C/Q converter 802, and the QLSS 803 in the norm extractor 800 may correspond to, or perform roles of a linear equation modification module 301, a C/Q converter 302, and a QLSS 303 in a quantum calculation center 300 in FIG. 3, respectively.

Continuing with reference to FIG. 8, the linear equation modification module 801 receives a MIMO channel matrix and a reception vector from a reception end, modifies the MIMO channel matrix and the reception vector in a manner preset for a QAM modulation scheme, and transfers the modified MIMO channel matrix and reception vector to the C/Q converter 802. The C/Q converter 802 transfers, to the QLSS 803, quantum information of the modified MIMO channel matrix and reception vector transferred from the linear equation modification module 801. The QLSS 803 obtains quantum information of a transmission vector through a quantum algorithm based on the quantum information of the modified MIMO channel matrix and reception vector. Here, the quantum algorithm used by the QLSS 803 may include an HHL algorithm. The QLSS 803 transfers the quantum information of the transmission vector to the amplitude estimator 804. Upon receiving the quantum information of the transmission vector, the amplitude estimator 804 obtains a magnitude of the transmission vector by using a quantum algorithm. Here, the quantum algorithm used by the amplitude estimator 804 may include a QAE algorithm. The amplitude estimator 804 transfers, to an amplitude extractor, the magnitude of the transmission vector, wherein the transmission vector is an input vector of a MIMO channel.

Figure 9:
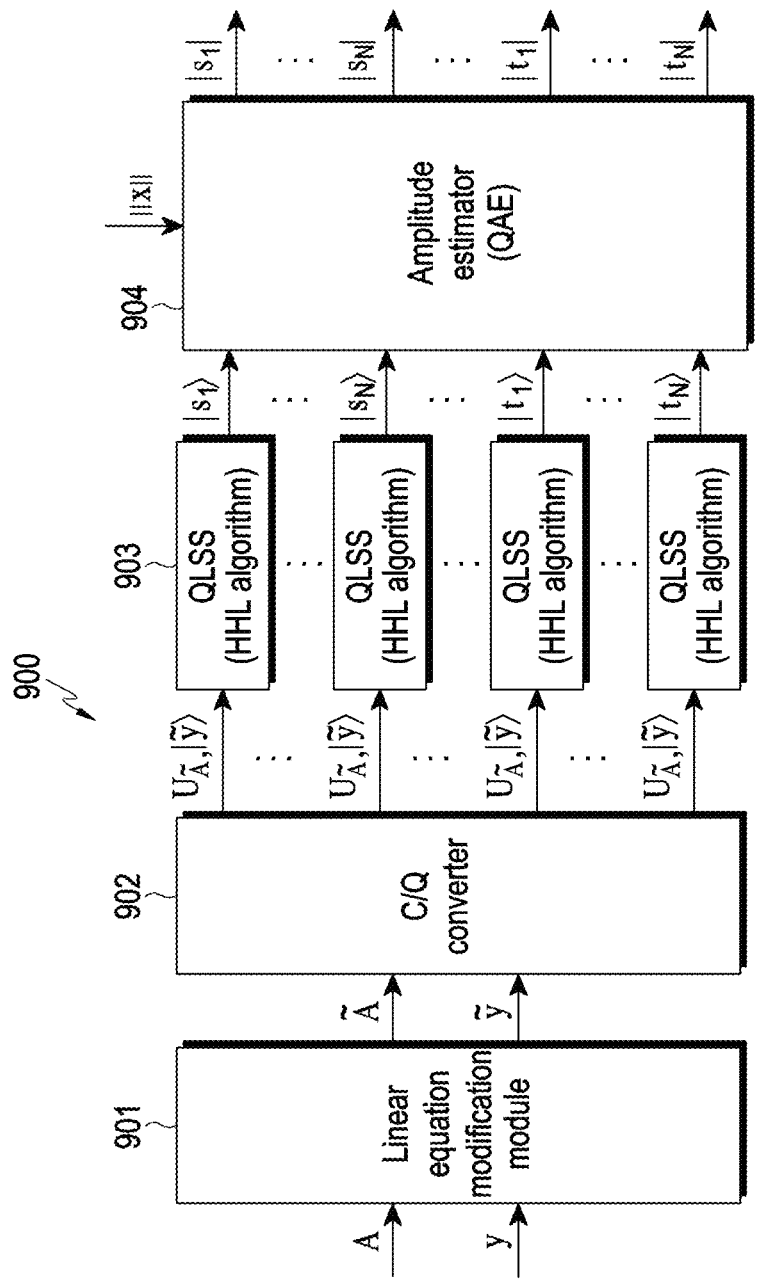
FIG. 9 illustrates, in block diagram format, an example of a structure of an amplitude extractor of a calculation center (such as shown in FIG. 7) according to various embodiments of the present disclosure.

FIG. 9 illustrates, in block diagram format, an example of a structure of an amplitude extractor in a quantum calculation center (for example, calculation center 700 in FIG. 7) according to various embodiments of the present disclosure.

Referring to the illustrative example of FIG. 9, an amplitude extractor 900 includes a linear equation modification module 901, a C/Q converter 902, a QLSS 903, and an amplitude estimator 904. Here, the linear equation modification module 901, the C/Q converter 902, and the QLSS 903 in the amplitude extractor 900 may correspond to, or perform roles of a linear equation modification module 301, a C/Q converter 302, and a QLSS 303 in a quantum calculation center 300 in FIG. 3, respectively.

Continuing with reference to FIG. 9, the linear equation modification module 901 receives a MIMO channel matrix and a reception vector from a reception end, modifies the MIMO channel matrix and the reception vector in a manner preset for a QAM modulation scheme, and transfers the modified MIMO channel matrix and reception vector to the C/Q converter 902. The C/Q converter 902 transfers, to the QLSS 903, quantum information of the modified MIMO channel matrix and reception vector transferred from the linear equation modification module 901. The QLSS 903 obtains quantum information of a transmission vector through a quantum algorithm based on the quantum information of the modified MIMO channel matrix and reception vector. Here, the quantum algorithm used by the QLSS 903 may include an HHL algorithm. The QLSS 903 transfers the quantum information of the transmission vector to the amplitude estimator 904. Upon receiving the quantum information of the transmission vector from the QLSS 903 and receiving a magnitude of the transmission vector from a norm extractor 800 in FIG. 8, the amplitude estimator 904 obtains a value of an individual amplitude of the transmission vector by using a quantum algorithm. Here, the quantum algorithm used by the amplitude estimator 904 may include a QAE algorithm. The amplitude estimator 904 transfers, to a phase extractor to be described later, the value of the individual amplitude of the transmission vector which is an input vector of a MIMO channel.

Meanwhile, a transmission vector $x=(x_1 \ldots x_N)^T$ of a transmission end in FIG. 9 is a QAM signal, so each term $x_j$ may be expressed as $x_j=s_j+i\cdot t_j$. Here, $s_j$ and $t_j$ have a value such as $s_j, t_j = \ldots, -5, -3, -1, 1, 3, 5, \ldots$. So, N QLSSs 903 are configured in parallel for $|s_j|$ and N QLSSs 903 are configured in parallel for $|t_j|$, that is, 2N QLSSs 903 are configured in parallel for obtaining N values of each of $s_j$ and $t_j$ in each term $x_j$ in the transmission vector $x=(x_1 \ldots x_N)^T$.

Figure 10:
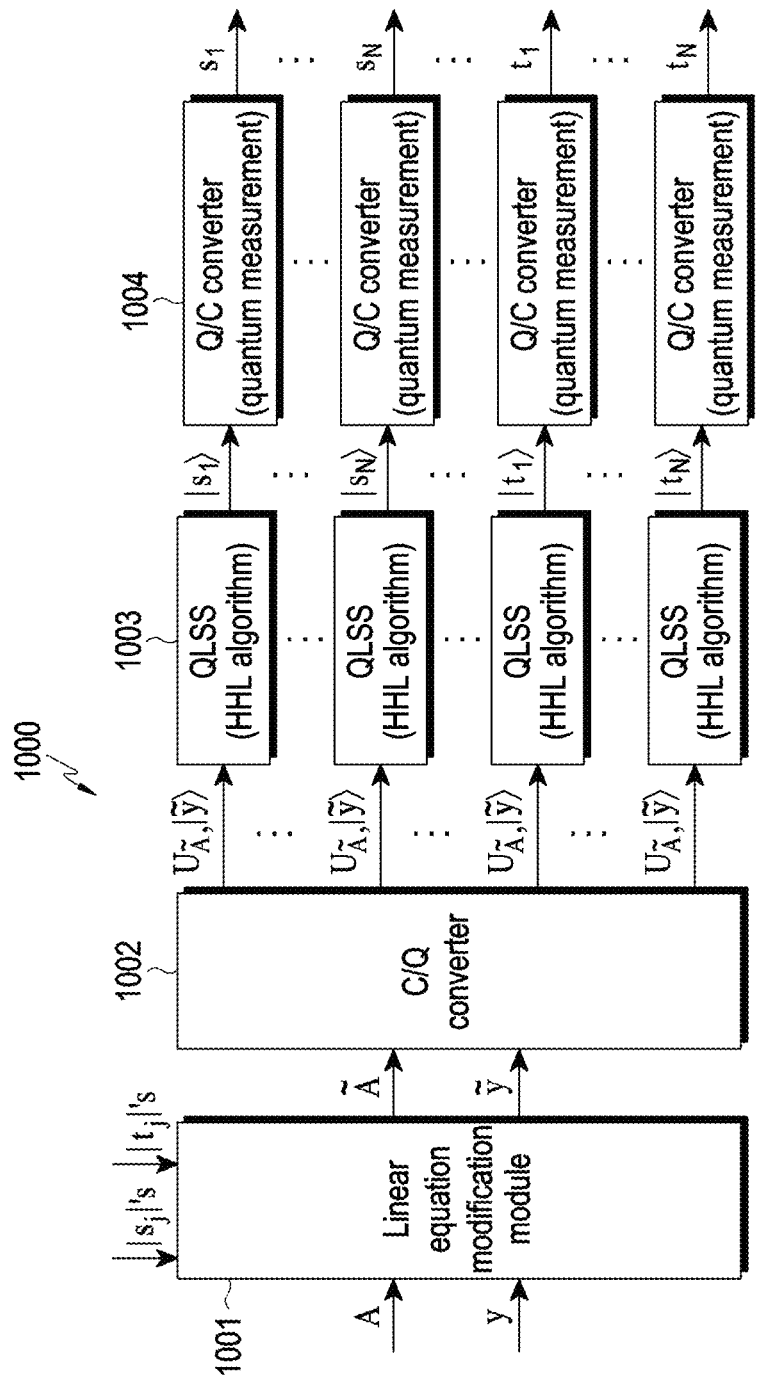
FIG. 10 illustrates, in block diagram format, an example of a structure of a phase extractor of a calculation center (such as shown in FIG. 7) according to some embodiments of the present disclosure.

FIG. 10 illustrates, in block diagram format, an example of a structure of a phase extractor suitable for use in a quantum calculation center (for example, calculation center 700 in FIG. 7) according to some embodiments of the present disclosure.

Referring to the explanatory example of FIG. 10, a phase extractor 1000 includes a linear equation modification module 1001, a C/Q converter 1002, a QLSS 1003, and a Q/C converter 1004. Here, the linear equation modification module 1001, the C/Q converter 1002, the QLSS 1003, and the Q/C converter 1004 in the phase extractor 1000 may correspond to, or perform roles of a linear equation modification module 301, a C/Q converter 302, a QLSS 303, and a Q/C converter 304 in a quantum calculation center 300 in FIG. 3, respectively.

Continuing with reference to FIG. 10, the linear equation modification module 1001 receives a MIMO channel matrix and a reception vector from a reception end, and receives a value of an individual amplitude of a transmission vector from an amplitude extractor 900 in FIG. 9. The linear equation modification module 1001 modifies the MIMO channel matrix and the reception vector in a manner preset for a QAM modulation scheme, and transfers the modified MIMO channel matrix and reception vector to the C/Q converter 1002. The C/Q converter 1002 transfers, to the QLSS 1003, quantum information of the modified MIMO channel matrix and reception vector. The QLSS 1003 obtains quantum information of the transmission vector through a quantum algorithm based on the quantum information of the modified MIMO channel matrix and reception vector. Here, the quantum algorithm used by the QLSS 1003 may include an HHL algorithm. The QLSS 1003 transfers the quantum information of the transmission vector to the Q/C converter 1004. Upon receiving the quantum information of the transmission vector, the Q/C converter 1004 obtains digital information for the quantum information of the transmission vector through quantum measurement. Here, the digital information is the transmission vector. The Q/C converter 1004 transfers, to the reception end, the transmission vector which is an input vector of a MIMO channel.

Meanwhile, for obtaining N values of each of $s_j$ and $t_j$ in each term $x_j$ in a transmission vector $x=(x_1 \ldots x_N)^T$ in FIG. 10, N QLSSs 1003 and N Q/C converters 1004 for $s_j$ are configured in parallel, and N QLSSs 1003 and N Q/C converters 1004 for $t_j$ are configured in parallel.

A method of obtaining a solution of a linear equation related to a MIMO channel matrix, a reception vector, and a transmission vector according to an embodiment of the present disclosure will be described below.

Figure 11:
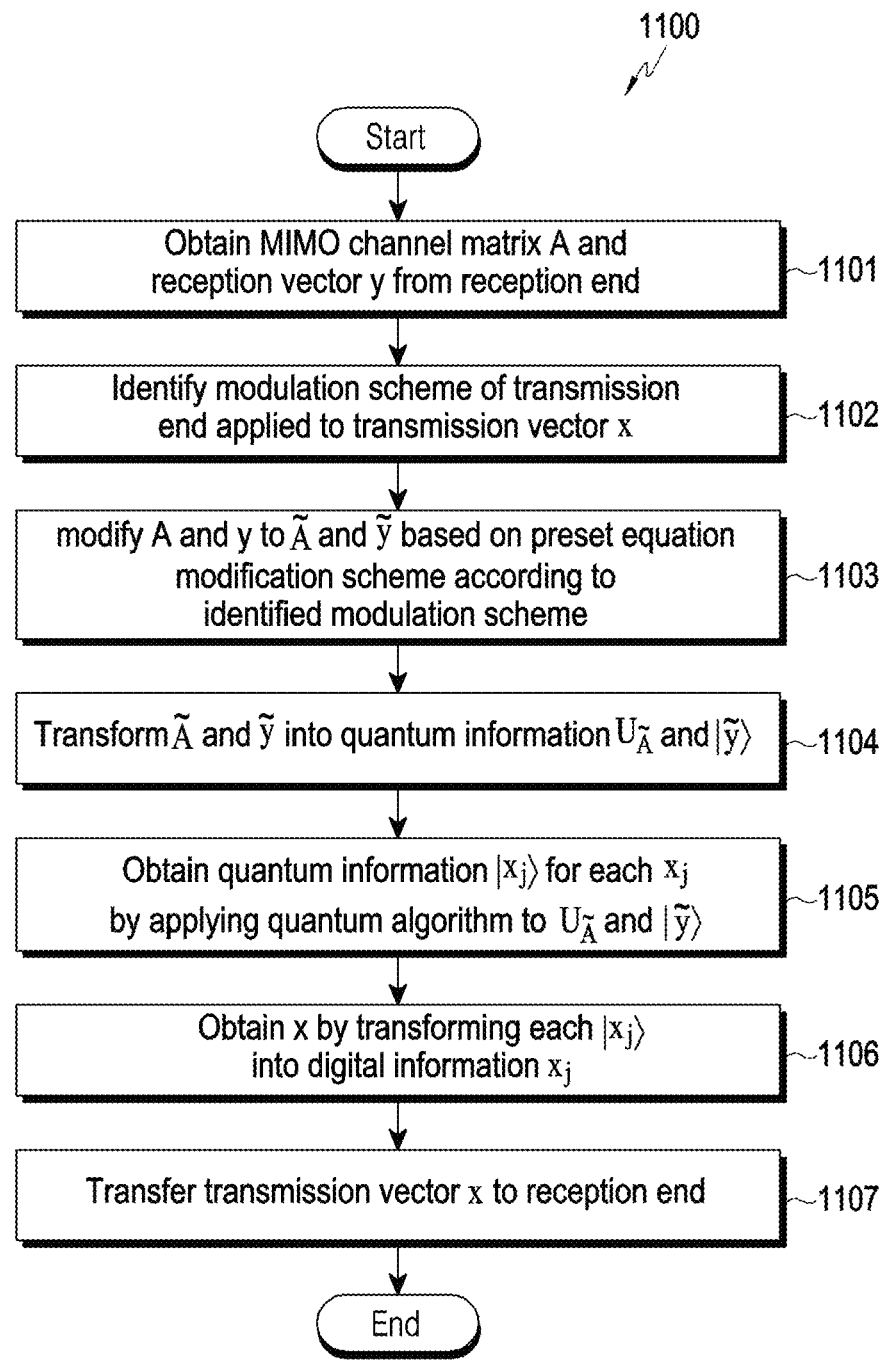
FIG. 11 illustrates in flowchart format, operations of an example procedure for detecting a transmission vector, which is an input of a MIMO channel, by using a MIMO channel matrix and a reception vector, according to certain embodiments of the present disclosure.

FIG. 11 is a flowchart illustrating operations of an example procedure for detecting a transmission vector, which is an input of a MIMO channel, by using a MIMO channel matrix and a reception vector, according to various embodiments of the present disclosure.

Referring to the illustrative example of FIG. 11, in operation 1101, a MIMO channel matrix A and a reception vector y, which are information about a linear equation Ax=y, are received from a reception end. Here, the MIMO channel matrix A is a matrix of size N×N, and the reception vector Y is a column vector of length N, expressed as $y=(y_1 \ldots y_N)^T$. And, N denotes the number of antennas at a transmission end and the reception end.

In operation 1102, a modulation scheme applied to a transmission vector x is identified. Here, the transmission end and the reception end may share the modulation scheme for the transmission vector x in advance, so the reception end may inform a quantum calculation center of the modulation scheme for the transmission vector x. For convenience of explanation, it has been described that operation 1102 is performed after operation 1101, but operation 1102 may be performed before operation 1101 or simultaneously with operation 1101.

In operation 1103, A and y are modified to $\tilde{A}$ and $\tilde{y}$, respectively based on a preset equation modification scheme according to the modulation scheme. A specific example of the preset equation modification scheme according to the modulation scheme will be described below.

$\tilde{A}$ and $\tilde{y}$ which are transformed through equation modification are digital information, so $\tilde{A}$ and $\tilde{y}$ are transformed into quantum information for applying a quantum algorithm. That is, $\tilde{A}$ and $\tilde{y}$ which are the digital information are transformed into $U_{\tilde{A}}$ and $|\tilde{y}\rangle$, which are the quantum information, respectively. Here, $U_{\tilde{A}}$, which is a unitary operator defined as $U_{\tilde{A}} = e^{2\pi i \tilde{A}}$, and is an operator used in a quantum algorithm. In addition, $|\ \rangle$ is a bracket notation of quantum mechanics which denotes a column vector of size 1, i.e., a quantum state. Hereinafter, when expressing a quantum state to be described, the bracket notation is used instead of a general matrix notation.

In operation 1105, a solution of a linear equation is obtained by applying a quantum algorithm to $U_{\tilde{A}}$ and $|\tilde{y}\rangle$. That is, quantum information $|x_j\rangle$ including information about each term $x_j$ in the transmission vector $x=(x_1 \ldots x_N)^T$ is obtained by applying the quantum algorithm to $U_{\tilde{A}}$ and $|\tilde{y}\rangle$. In an embodiment, the quantum algorithm such as an HHL algorithm may be used to obtain the solution of the linear equation.

In operation 1106, the quantum information $|x_j\rangle$ is transformed to obtain digital information $x_j$, and finally, the solution $x=(x_1 \ldots x_N)^T$ of the linear equation is obtained.

In operation 1107, the obtained transmission vector $x=(x_1 \ldots x_N)^T$ is transferred to the reception end.

A preset equation modification method and a method for obtaining a solution of a linear equation will described for each of the following computational cases: a case that a modulation scheme of a transmission end is a BPSK modulation scheme; a case that the modulation scheme of the transmission end is a QPSK modulation scheme; a case that the modulation scheme of the transmission end is an MPSK modulation scheme; and a case that the modulation scheme of the transmission end is a QAM modulation scheme.

<BPSK Modulation Scheme>

If a modulation scheme applied to a transmission vector $x=(x_1 \ldots x_N)^T$ is a BPSK modulation scheme, a MIMO channel matrix A and a reception vector $y=(y_1 \ldots y_N)^T$ are modified as expressed in Equation 1.

$$\tilde{A} = \begin{pmatrix} & A & & & O \\ 0 & \ldots & & 0 & 1 & 0 \\ 0 & \ldots & 0 & -N & 0 & \ldots & 0 & 0 & 1 \end{pmatrix}, \tilde{y} = \begin{pmatrix} y_1 \\ \vdots \\ y_N \\ N \\ 0 \end{pmatrix} \quad \text{Equation 1}$$

Equation 1 is an equation generated by adding new transmission vector components as expressed in Equation 2 to a linear equation $Ax=y$. Here, $\tilde{A}$ is a form expanded by adding two rows and columns to the MIMO channel matrix A. O denotes a zero matrix of size N×2. N denotes the number of antennas of a transmission end and a reception end. Also, $-N$ in $\tilde{A}$ is located at the $j(1 \le j \le N)$th column for $x_j$.

$$x_{N+1}=N, x_{N+2}=Nx_j \quad \text{Equation 2}$$

In Equation 2, $x_{N+1}$ and $x_{N+2}$ are variables which are added for the transmission vector.

The last two rows added in Equation 1 are configured to satisfy $x_{N+1}=N$, and $-Nx_j+x_{N+2}=0$ according to Equation 2.

If a modified equation is solved by using a quantum algorithm, Equation 2 provides a solution of the modified equation as quantum information to have information about $x_j$. So, Equation 2 makes it possible to extract 1 bit information of $x_j$ without an error in a quantum measurement process. This will be described in detail below.

The values $\tilde{A}$ and $\tilde{y}$ for the modified equation given in Equation 1 are transformed into quantum information $U_{\tilde{A}}$ and $|\tilde{y}\rangle$, respectively.

Referring to Equation 1 and Equation 2, a solution $\tilde{x}$ of a linear equation $\tilde{A}\tilde{x}=\tilde{y}$ may be expressed by Equation 3.

$$\tilde{x}=(x_1 \ldots x_N x_{N+1} x_{N+2})^T=(x_1 \ldots x_N N Nx_j)^T \quad \text{Equation 3}$$

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 4 after $\tilde{x}$ in Equation 3 is normalized.

$$|\tilde{x}\rangle = \sqrt{\frac{1}{N+2N^2}} \begin{pmatrix} x_1 \\ \vdots \\ x_N \\ N \\ Nx_j \end{pmatrix} \quad \text{Equation 4}$$

In Equation 4, $(x_1 \ldots x_N N Nx_j)^T$ is the solution $\tilde{x}$ of the linear equation $\tilde{A}\tilde{x}=\tilde{y}$ in Equation 3, and $1/\sqrt{N+2N^2}$ is a factor which is generated by normalizing $\tilde{x}$. $|\tilde{x}\rangle$ in Equation 4 may be expressed as Equation 5 which is configured with $(0 \ldots 0 N Nx_j)^T$, which is a part with a solution which is newly generated by adding an equation, and $(x_1 \ldots x_N 0 0)^T$ which is a part with a solution of an original equation.

$$|\tilde{x}\rangle = \sqrt{\frac{1}{N+2N^2}} \left[ \begin{pmatrix} 0 \\ \vdots \\ 0 \\ N \\ Nx_j \end{pmatrix} + \begin{pmatrix} x_1 \\ \vdots \\ x_N \\ 0 \\ 0 \end{pmatrix} \right] \quad \text{Equation (5)}$$

If each of $(0 \ldots 0 N Nx_j)^T$ and $(x_1 \ldots x_N 0 0)^T$ is expressed as normalized quantum information, Equation 5 may be expressed through Equation 6.

$$|\tilde{x}\rangle = \sqrt{\frac{2N}{1+2N^2}} |x_j\rangle + \sqrt{\frac{1}{1+2N^2}} |\phi\rangle \quad \text{Equation (6)}$$

Here, $$|x_j\rangle = \frac{1}{\sqrt{2N^2}} (0 \ldots 0 N Nx_j)^T, \text{ and } |\phi\rangle = \frac{1}{\sqrt{N}} (x_1 \ldots x_N 0 0)^T.$$

$|x_j\rangle$ is vertical to $|\phi\rangle$.

In $|\tilde{x}\rangle$ in Equation 6, $|x_j\rangle$ has bit information for $x_j$, an amplitude of $|x_j\rangle$ is $$\sqrt{\frac{2N}{1+2N}},$$

so, through a quantum measurement process, quantum information $|x_j\rangle$ is obtained approximating to probability 100% as N increases.

Digital information $x_j$ is extracted by performing quantum measurement on the quantum information $|x_j\rangle$. Here, $x_j=+1$, so quantum information $$\frac{1}{\sqrt{2N^2}} (0 \ldots 0 N N)^T \text{ and } \frac{1}{\sqrt{2N^2}} (0 \ldots 0 N -N)^T$$

which may be $|x_j\rangle$ are vertical to each other. In quantum measurement, states which are vertical to each other may be distinguished without an error, whether it is $x_j=+1$ or $x_j=-1$ is obtained without an error by measuring $|x_j\rangle$.

<QPSK Modulation Scheme>

If a modulation scheme applied to a transmission vector $x=(x_1 \ldots x_N)^T$ is a QPSK modulation scheme, it is expressed as $x_j=a_j+ib_j(1 \le j \le N)$, so different equation modifications are applied to obtain $a_j$ and $b_j$.

First, a MIMO channel matrix A and a reception vector $y=(y_1 \ldots y_N)^T$ are modified as expressed in Equation 7 for obtaining $a_j$.

$$\tilde{A} = \begin{pmatrix} A & O_1 & & O_3 \\ O_2 & \overline{A} & & \\ 0 \ldots 0 & 0 & 0 \ldots 0 & 0 \ldots 0 & 0 & 0 \ldots 0 & 1 & 0 \\ 0 \ldots 0 & -N & 0 \ldots 0 & 0 \ldots 0 & -N & 0 \ldots 0 & 0 & 2 \end{pmatrix}, \quad \text{Equation 7}$$

$$\tilde{y} = \begin{pmatrix} y \\ \overline{y} \\ N \\ 0 \end{pmatrix}$$

Here, $\tilde{A}$ is a matrix of size $(2N+2) \times (2N+2)$, and two $-N$s in $\tilde{A}$ are located at the jth column and the N+j column for $x_j$, respectively. In addition, $O_1$ and $O_2$ denote zero matrixes of size N×N, and $O_3$ denotes a zero matrix of size 2N×2. $\overline{A}$ denotes a complex conjugate matrix of A, and $\overline{y}$ denotes a complex conjugate matrix of y. Also, N denotes the number of antennas of a transmission end and a reception end.

Equation 7 is an equation generated by newly adding a transmission vector component as expressed in Equation 8 to an original linear equation Ax=y.

$$\overline{A}x' = \overline{y}, x_{2N+1} = N, -Nx_j - Nx_{N+j} + 2x_{2N+2} = 0 \quad \text{Equation 8}$$

In Equation 8, $\overline{A}$ and $\overline{y}$ are complex conjugate matrixes of A and y, respectively, $x' = (x_{N+1} \ldots x_{2N})^T$, $x_{2N+1}$, and $x_{2N+2}$ are variables which are added for the transmission vector, and $x_{N+j} = \overline{x_j}$. Further, two $-N$s in $\tilde{A}$ are located at the jth column and the N+jth column for $x_j$, respectively.

If a modified equation is solved by using a quantum algorithm, Equation 8 provides a solution of the modified equation as quantum information with information about $a_j$. So, Equation 8 makes it possible to extract 1 bit information of $a_j$ without an error in a quantum measurement process. This will be described in detail below.

Referring to Equations 7 and 8, solutions $x_1, \ldots, x_N$ are obtained from the first N equations of a linear equation $\tilde{A}\tilde{x} = \tilde{y}$, and solutions $\overline{x_1}, \ldots, \overline{x_N}$ are obtained from the next N equations. From the last two equations, $x_{2N+1} = N$ and $x_{2N+2} = \frac{1}{2}(Nx_j + Nx_{N+j}) = \frac{1}{2}(Nx_j + N\overline{x_j}) = Na_j$ are obtained. In summary, a solution $\tilde{x}$ of the linear equation $\tilde{A}\tilde{x} = \tilde{y}$ may be expressed in Equation 9.

$$\tilde{x} = (x_1 \ldots x_N x_{N+1} \ldots x_{2N} x_{2N+1} x_{2N+2})^T = \quad \text{Equation (9)}$$
$$(x_1 \ldots x_N \overline{x_1} \ldots \overline{x_N} N N a_j)^T$$

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 10 after $\tilde{x}$ in Equation 9 is normalized.

$$|\tilde{x}\rangle = \sqrt{\frac{1}{4N + 2N^2}} (x_1 \ldots x_N \overline{x_1} \ldots \overline{x_N} N N a_j)^T \quad \text{Equation 10}$$

Referring to Equation 10, a part with a solution of an original equation is $(x_1 \ldots x_N \, 0 \ldots 0 \, 0 \, 0)^T$, a part with a solution which is newly generated by adding an equation $\overline{A}x' = \overline{y}$ in Equation 8 is $(0 \ldots 0 \overline{x_1} \ldots \overline{x_N} 0 \, 0)^T$, and $\overline{x_j}$s are conjugate complex values of $x_j$s which are solutions of the original equation.

Here, a part with a solution which is newly generated by adding an equation $x_{2N+1} = N$, $-Nx_j - Nx_{N+j} + 2x_{2N+2} = 0$ in Equation 8 is $(0 \ldots 0 \, 0 \ldots 0N \, Na_j)^T$ where information for $a_j$ separately exists. $(0 \ldots 0 \, 0 \ldots 0N \, Na_j)^T$ and a remaining part are separated as expressed in Equation 11.

$$|\tilde{x}\rangle = \sqrt{\frac{1}{4N + 2N^2}} [(0 \ldots 00 \ldots 0NNa_j)^T + \quad \text{Equation 11}$$
$$(x_1 \ldots x_N \overline{x_1} \ldots \overline{x_N} 00)^T]$$

If each of $(0 \ldots 0 \, 0 \ldots 0N \, Na_j)^T$ and $(x_1 \ldots x_N \overline{x_1} \ldots \overline{x_N} \, 0 \, 0)^T$ is expressed as normalized quantum information, Equation 11 may be expressed as Equation 12.

$$|\tilde{x}\rangle = \sqrt{\frac{N}{2+N}} |\tilde{x}\rangle = \quad \text{Equation 12}$$
$$\sqrt{\frac{N}{2+N}} |a_j\rangle + \sqrt{\frac{2}{2+N}} |\phi\rangle|a_j\rangle + \sqrt{\frac{2}{2+N}} |\phi\rangle$$

In Equation 12, $$|a_j\rangle = \sqrt{\frac{1}{2N^2}} (0 \ldots 00 \ldots 0NNa_j)^T \text{ and}$$

$$|\phi\rangle = \sqrt{\frac{1}{4N}} (x_1 \ldots x_N \overline{x_1} \ldots \overline{x_N} 00)^T.$$

$|a_j\rangle$ and $|\phi\rangle$ are vertical to each other.

In $|\tilde{x}\rangle$ in Equation 12, $|a_j\rangle$ has bit information for $a_j$, an amplitude of $|a_j\rangle$ is $$\sqrt{\frac{N}{2+N}},$$

so, through a quantum measurement process, quantum information $|a_j\rangle$ is obtained approximating to probability 100% as N increases.

Digital information $a_j$ is extracted by performing quantum measurement on the quantum information $|a_j\rangle$. Here, $a_j = \pm 1$, so all possible quantum information $|a_j\rangle$ is vertical to each other. In quantum measurement, states which are vertical to each other may be distinguished without an error, a value of $a_j$ is obtained without an error by measuring $|a_j\rangle$.

Next, a MIMO channel matrix A and a reception vector $y = (y_1 \ldots y_N)^T$ are modified as expressed in Equation 13 for obtaining $b_j$.

$$\tilde{A} = \begin{pmatrix} A & O_1 & & \\ O_2 & \tilde{A} & & O_3 \\ 0 \ldots 0 & 0 & 0 \ldots 0 & 0 \ldots 0 & 0 & 0 \ldots 0 & 1 & 0 \\ 0 \ldots 0 & -N & 0 \ldots 0 & 0 \ldots 0 & N & 0 \ldots 0 & 0 & 2i \end{pmatrix}, \quad \text{Equation 13}$$

$$\tilde{y} = \begin{pmatrix} y \\ \bar{y} \\ N \\ 0 \end{pmatrix}$$

In Equation 13, $\tilde{A}$ is a matrix of size $(2N+2) \times (2N+2)$, $-N$ and $N$ in $\tilde{A}$ are located at the jth column and the N+j column for $x_j$, respectively. $\overline{A}$ denotes a complex conjugate matrix of A, and $\bar{y}$ denotes a complex conjugate matrix of y. Also, N denotes the number of antennas of a transmission end and a reception end. In addition, $O_1$ and $O_2$ denote zero matrices of size N×N, and $O_3$ denotes a zero matrix of size 2N×2.

Equation 13 is an equation generated by newly adding components of a transmission vector as expressed in Equation 14 to an original linear equation Ax=y.

$$\overline{A}x' = \bar{y}, x_{2N+1} = N, -Nx_j + Nx_{N+j} + 2ix_{2N+2} = 0 \quad \text{Equation 14}$$

In Equation 14, $\overline{A}$ and $\bar{y}$ are complex conjugate matrices of A and y, respectively, $x' = (x_{N+1} \ldots x_{2N})^T$, $x_{2N+1}$, and $x_{2N+2}$ are variables which are added for the transmission vector, and $x_{N+j} = \overline{x_j}$. Further, $-N$ and $N$ in $\overline{A}$ are located at the jth column and the N+jth column for $x_j$, respectively.

If a modified equation is solved by using a quantum algorithm, Equation 14 makes a solution of the modified equation as quantum information to have information about $b_j$. So, Equation 14 makes it possible to extract 1 bit information of $b_j$ without an error in a quantum measurement process. This will be described in detail below.

Values $\tilde{A}$ and $\tilde{y}$ for the modified equation given in Equation 13 are transformed into $U_{\tilde{A}}$ and $|\tilde{y}\rangle$, which are quantum information, respectively.

Referring to Equations 13 and 14, solutions $x_1, \ldots, x_N$ are obtained from the first N equations of a linear equation $\tilde{A}\tilde{x} = \tilde{y}$, and solutions $\overline{x_1}, \ldots, \overline{x_N}$ are obtained from the next N equations. From the last two equations, $x_{2N+1} = N$ and $x_{2N+2} = \frac{1}{2}(Nx_j - Nx_{N+j}) = \frac{1}{2}(Nx_j - N\overline{x_j})$ are obtained. In summary, a solution $\tilde{x}$ of the linear equation $\overline{A}\tilde{x} = \tilde{y}$ may be expressed in Equation 15.

$$\tilde{x} = (x_1 \ldots x_N x_{N+1} \ldots x_{2N} x_{2N+1} x_{2N+2})^T = \quad \text{Equation 15}$$
$$(x_1 \ldots x_N \overline{x_1} \ldots \overline{x_N} NNb_j)^T$$

Meanwhile, due to a characteristic of quantum computing, quantum information is expressed as a vector whose magnitude is normalized to 1. Therefore, a solution $|\tilde{x}\rangle$ of an equation obtained by applying a quantum algorithm, is a vector, such as expressed in Equation 16 after $\tilde{x}$ in Equation 15 is normalized.

$$|\tilde{x}\rangle = \sqrt{\frac{1}{4N + 2N^2}} (x_1 \ldots x_N \overline{x_1} \ldots \overline{x_N} NNb_j)^T \quad \text{Equation 16}$$

Referring to Equation 16, a part with a solution of an original equation is $(x_1 \ldots x_N \ 0 \ldots 0 \ 0 \ 0)^T$, a part with a solution which is newly generated by adding an equation $\overline{A}x' = \bar{y}$ in Equation 14 is $(0 \ldots 0\overline{x_1} \ldots \overline{x_N} \ 0 \ 0)^T$, and $\overline{x_j}$s are conjugate complex values of $x_j$s which are solutions of the original equation.

Here, a part with a solution which is newly generated by adding an equation $x_{2N+1} = N$, $-Nx_j + Nx_{N+1} + 2x_{2N+2} = 0$ in Equation 14 is $(0 \ldots 0 \ 0 \ldots 0N \ Nb_j)^T$ where information for $b_j$ exists separately as $(0 \ldots 0 \ 0 \ldots 0N \ Nb_j)^T$ and a remaining part are separated as expressed in Equation 17.

$$|\tilde{x}\rangle = \sqrt{\frac{1}{4N + 2N^2}} [(0 \ldots 00 \ldots 0NNb_j)^T + \quad \text{Equation 17}$$
$$(x_1 \ldots x_N \overline{x_1} \ldots \overline{x_N} 00)^T]$$

If each of $(0 \ldots 0 \ 0 \ldots 0N \ Nb_j)^T$ and $(x_1 \ldots x_N \overline{x_1} \ldots \overline{x_N} 0 \ 0)^T$ is expressed as normalized quantum information, Equation 17 may be expressed as Equation 18.

$$|\tilde{x}\rangle = \sqrt{\frac{N}{2+N}} |b_j\rangle + \sqrt{\frac{2}{2+N}} |\phi\rangle |\tilde{x}\rangle = \quad \text{Equation 18}$$
$$\sqrt{\frac{N}{2+N}} |b_j\rangle + \sqrt{\frac{2}{2+N}} |\phi\rangle$$

In Equation 18, $$|b_j\rangle = \sqrt{\frac{1}{2N^2}} (0 \ldots 00 \ldots 0NNb_j)^T \text{ and}$$

$$|\phi\rangle = \sqrt{\frac{1}{4N}} (x_1 \ldots x_N \overline{x_1} \ldots \overline{x_N} 00)^T.$$

Further, $|b_j\rangle$ and $|\phi\rangle$ are vertical to each other.

In $|\tilde{x}\rangle$ in Equation 18, $|b_j\rangle$ has bit information for $b_j$, an amplitude of $|b_j\rangle$ is $$\frac{N}{2+N},$$

so, through a quantum measurement process, quantum information $|b_j\rangle$ is obtained approximating to a probability of 100% as N increases.

Digital information $b_j$ is extracted by performing quantum measurement on the quantum information $|b_j\rangle$. Here, $b_j = \pm 1$, so all possible quantum information $|b_j\rangle$ is vertical to each other. In quantum measurement, states which are vertical to each other may be distinguished without an error, and a value of $b_j$ is obtained without an error by measuring $|b_j\rangle$.

<MPSK Modulation Scheme>

If a modulation scheme applied to transmission vector $x = (x_1 \ldots x_N)^T$ is an MPSK modulation scheme, a MIMO channel matrix A and a reception vector $y = (y_1 \ldots y_N)^T$ are modified as expressed in Equation 19.

$$\tilde{A} = \begin{pmatrix} I_N & & & \\ O & A & & \\ & Y & A & \\ & & \ddots & \ddots \\ & & & Y & A \end{pmatrix} \begin{pmatrix} \Omega & & & \\ & \Omega & & \\ & & \ddots & \\ & & & \Omega \\ & & & & \Omega \end{pmatrix}, \quad \text{Equation 19}$$

-continued $$\tilde{y} = \begin{pmatrix} J \\ y \\ 0 \\ \vdots \\ 0 \end{pmatrix}$$

In Equation 19, O is a zero matrix of size N×N, and Y is an N×N matrix in which only the j(1≤j≤N)th column for is $x_j$ is −y. Further, $\Omega$=diag(1, . . . 1, $N^{-1}$, 1, . . . , 1) is an N×N diagonal matrix whose jth term for $x_j$ is $N^{-1}$, and J=(1 . . . 1)$^T$. $I_N$ is an identity matrix of size N×N. Also, N denotes the number of antennas of a transmission end and a reception end.

In Equation 19, $\tilde{A}$ is an MN×MN matrix, and $\tilde{y}$, which is generated by modifying a linear equation Ax=y to an equation whose variable is MN, is a column vector of length MN.

A solution $\tilde{x}$ of a linear equation $\tilde{A}\tilde{x}=\tilde{y}$ is expressed for $x_j$ as expressed in Equation 20.

$$\tilde{x} = N(1 x_j x_j^2 \ldots x_j^M) \otimes u + r \qquad \text{Equation 20}$$

In Equation 20, u=(0 . . . 0 1 0 . . . 0)$^T$ is a column vector in which only the jth term is 1 for $x_j$, and r is a remaining part except for a preceding term $N(1\ x_j\ x_j^2\ \ldots\ x_j^M) \otimes u$ in $\tilde{x}$.

Meanwhile, due to a characteristic of quantum computing, quantum information is expressed as a vector whose magnitude is normalized to 1. Therefore, a solution $|\tilde{x}\rangle$ of an equation obtained by applying a quantum algorithm becomes a vector as expressed in Equation 21 after $\tilde{x}$ in Equation 20 is normalized.

$$|\tilde{x}\rangle = \frac{N}{\sqrt{N^2 + (N-1)}} |x_j\rangle |j-1\rangle + \frac{\sqrt{(N-1)}}{\sqrt{N^2 + (N \mapsto 1)}} |\phi\rangle \qquad \text{Equation 21}$$

In Equation 21, $$|x_j\rangle = \frac{1}{\sqrt{M}} (1\ x_j x_j^2\ \ldots\ x_j^M),$$

and $|j-1\rangle$ is an expression of a quantum state of u in Equation 20. $|\phi\rangle$ is a part which is vertical to $|x_j\rangle\ |j-1\rangle$.

In $|\tilde{x}\rangle$ in Equation 21, $|x_j\rangle$ is a part which includes information for $x_j$, an amplitude of $|x_j\rangle$ is $$\frac{N^2}{N^2 + (N-1)},$$

so, through a quantum measurement process, a quantum state $|x_j\rangle$ is obtained, approximating to a probability of 100% as N increases.

The quantum state $|x_j\rangle$ may be expressed as Equation 22.

$$|x_j\rangle = \otimes_{t=0}^{m-1} |x_j^{(t)}\rangle = |x_j^{(m-1)}\rangle \otimes |x_j^{(m-2)}\rangle \otimes \ldots \otimes |x_j^{(0)}\rangle \qquad \text{Equation 22}$$

In Equation 22, m=log$_2$ M, and $$|x_j^{(t)}\rangle = \frac{1}{\sqrt{2}} \begin{pmatrix} 1 \\ x_j^{2^t} \end{pmatrix}.$$

The quantum state $|x_j\rangle$ in Equation 22 may be regarded as a case in which each quantum state $|x_j^{(t)}\rangle$ exists in m systems.

In Equation 22, the information for is extracted through a quantum measurement process sequentially from a quantum state $|x_j^{(m-1)}\rangle$ in the first system of the quantum state $|x_j\rangle$ to a quantum state $$\frac{1}{\sqrt{2}} \begin{pmatrix} 1 \\ x_j \end{pmatrix}$$

in the last system of the quantum state $|x_j\rangle$. This will be described in detail below.

$$x_j = e^{i(\frac{2\pi}{M}k)},$$

so the quantum state $|x_j^{(m-1)}\rangle$ in the first system of the quantum state $|x_j\rangle$ in Equation 22 may be expressed as Equation 23.

$$|x_j^{(m-1)}\rangle = \frac{1}{\sqrt{2}} \begin{pmatrix} 1 \\ e^{i(\frac{2\pi}{M} k 2^{m-1})} \end{pmatrix} \qquad \text{Equation (23)}$$

k is a number which belongs to {0, 1, . . . , M−1}, so k is expressed as Equation 24 when being expressed in a binary notation.

$$k = k_{m-1} k_{m-2} \ldots k_{0(2)} \qquad \text{Equation 24}$$

Referring to Equation 24, $k2^{m-1}$ in $|x_j^{(m-1)}\rangle$ in in Equation 23 may be expressed as Equation 25.

$$k2^{m-1} = k_0 0 \ldots 0_{(2)} = 2^{m-1} k_0 \qquad \text{Equation (25)}$$

Referring to Equation 25, $|x_j^{(m-1)}\rangle$ in Equation 23 may be expressed as Equation 26.

$$|x_j^{(m-1)}\rangle = \frac{1}{\sqrt{2}} \begin{pmatrix} 1 \\ e^{i(\frac{2\pi}{M} k 2^{m-1} k_0)} \end{pmatrix} = \frac{1}{\sqrt{2}} \begin{pmatrix} 1 \\ e^{i(\pi k_0)} \end{pmatrix} \qquad \text{Equation 26}$$

Where $k_0$ is 0 or 1, so states which $|x_j^{(m-1)}\rangle$ in Equation 26 may satisfy a condition that they are vertical to each other. In quantum measurement, states which are vertical to each other may be distinguished without an error, and a value of $k_0$ may be obtained by measuring $|x_j^{(m-1)}\rangle$.

A quantum state $|x_j^{(m-2)}\rangle$ which exists in the second system in the quantum state $|x_j\rangle$ in Equation 22 may be expressed as Equation 27.

$$|x_j^{(m-2)}\rangle = \frac{1}{\sqrt{2}} \begin{pmatrix} 1 \\ e^{i(\frac{2\pi}{M} k 2^{m-2})} \end{pmatrix} \qquad \text{Equation (27)}$$

Referring to Equation 24, $k2^{m-2}$ in $|x_j^{(m-2)}\rangle$ in Equation 27 be expressed as Equation 28.

$$k2^{m-2} = k_1 k_0 0 \ldots 0 0_{(2)} = 2^{m-1} k_1 + 2^{m-2} k_0 \qquad \text{Equation 28}$$

Referring to Equation 28, $|x_j^{(m-2)}\rangle$ in Equation 27 be expressed as Equation 29.

$$|x_j^{(m-2)}\rangle = \frac{1}{\sqrt{2}} \begin{pmatrix} 1 \\ e^{i(\frac{2\pi}{M}(2^{m-1}k_1 + 2^{m-z}k_0))} \end{pmatrix} = \frac{1}{\sqrt{2}} \begin{pmatrix} 1 \\ e^{i(\pi k_1 + \frac{\pi}{2}k_0)} \end{pmatrix} \quad \text{Equation 29}$$

The value of $k_0$ is obtained in the previous operation, $k_1$ is 0 or 1, so states which $|x_j^{(m-2)}\rangle$ in Equation 29 may satisfy the condition that they are vertical to each other. In quantum measurement, states which are vertical to each other may be distinguished without an error, a value of $k_1$ is obtained by measuring $|x_j^{(m-2)}\rangle$.

In this way, if a quantum measurement process is sequentially performed to a quantum state $$\frac{1}{\sqrt{2}} \begin{pmatrix} 1 \\ x_j \end{pmatrix}$$

in the last system in $|x_j\rangle$ in Equation 22, a value of k is obtained by obtaining from a value of $k_0$ to a value of $k_{m-1}$.

$$x_j = e^{i(\frac{2}{M}k)},$$

so a value of $x_j$ is extracted without an error.

A preset equation modification method and a method of obtaining a solution of a linear equation in a norm extractor 701, an amplitude extractor 702, and a phase extractor 703 in FIG. 7 if a modulation scheme of a transmission end is a QAM modulation scheme will be described.

<QAM Modulation Scheme: Norm Extractor>

A MIMO channel matrix A and a reception vector $y=(y_1 \ldots y_N)^T$ are modified as expressed in Equation 30 for obtaining a magnitude of a transmission vector $x=(x_1 \ldots x_N)^T$.

$$\tilde{A} = \begin{pmatrix} 1 & O_1 \\ O_2 & A \end{pmatrix}, \tilde{y} = \begin{pmatrix} N \\ y_1 \\ \vdots \\ y_N \end{pmatrix} \quad \text{Equation 30}$$

In Equation 30, $\tilde{A}$ is a matrix of size $(N+1)\times(N+1)$. $O_1$ is a zero matrix of size $1\times N$, and $O_2$ is a zero matrix of size $N\times 1$. Also, N denotes the number of antennas of a transmission end and a reception end.

A solution $\tilde{x}$ of a linear equation $\tilde{A}\tilde{x}=\tilde{y}$ may be expressed by Equation 31.

$$\tilde{x}=(Nx_1 \ldots x_N)^T \quad \text{Equation 31}$$

Meanwhile, quantum information is expressed as a vector whose magnitude is normalized to 1, a solution $|\tilde{x}\rangle$ of an equation which is obtained by applying a quantum algorithm (e.g., an HHL) is a vector as expressed in Equation 32 where $\tilde{x}$ in Equation 31 is normalized.

$$|\tilde{x}\rangle = \frac{N}{\sqrt{\|x\|^2 + N^2}}|0\rangle + \frac{\|x\|}{\sqrt{\|x\|^2 + N^2}}|\phi\rangle \quad \text{Equation 32}$$

In Equation 32, $|\phi\rangle$ is a quantum state vertical to $|0\rangle$.
A probability amplitude a of the quantum state $|0\rangle$ in Equation 32 is defined by Equation 33.

$$a \equiv \frac{N^2}{\|x\|^2 + N^2} \quad \text{Equation 33}$$

If a value of Equation 33 is extracted by applying a quantum algorithm (e.g., a QAE algorithm), a magnitude $\|x\|$ of the transmission vector is obtained.

<QAM Modulation Scheme: Amplitude Extractor>

For obtaining $|s_j|$ and $|t_j|$ which are values of individual amplitudes for each term $x_j=s_j+i\cdot t_j(1\leq j\leq N)$ of a transmission vector $x=(x_1 \ldots x_N)^T$, different equation modifications are applied.

First, a MIMO channel matrix A and a reception vector $y=(y_1 \ldots y_N)^T$ are modified as expressed in Equation 34 to obtain $|s_j|$.

The MIMO channel matrix A and the reception vector $y=(y_1 \ldots y_N)^T$ are modified as expressed in Equation 34.

$$\tilde{A} = \begin{pmatrix} 2 & 0 \ldots 0-N0 \ldots 0 & 0 \ldots 0-N0 \ldots 0 \\ O_1 & A & O_2 \\ O_1 & O_2 & \overline{A} \end{pmatrix}, \tilde{y} = \begin{pmatrix} 0 \\ y \\ \overline{y} \end{pmatrix} \quad \text{Equation 34}$$

In Equation 34, $O_1$ is a zero matrix of size $N\times 1$, and $O_2$ is a zero matrix of size $N\times N$. $\overline{A}$ and $\overline{y}$ are complex conjugate matrixes of A and y, respectively, and two $-N_s$ in $\tilde{A}$ are located at the $j$th column and the N+jth column for $x_j$, respectively. Also, N denotes the number of antennas of a transmission end and a reception end.

A solution $\tilde{x}$ of a linear equation $\tilde{A}\tilde{x}=\tilde{y}$ is expressed as Equation 35.

$$\tilde{x}=(Ns_jx^T\overline{x}^T)^T \quad \text{Equation 35}$$

In Equation 35, $\overline{x}$ is a complex conjugate matrix of x.

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 36 after $\tilde{x}$ in Equation 35 is normalized.

$$|\tilde{x}\rangle = \frac{Ns_j}{\sqrt{N^2|s_j|^2 + 2\|x\|^2}}|0\rangle + \frac{\sqrt{2}\|x\|}{\sqrt{N^2|s_j|^2 + 2\|x\|^2}}|\phi\rangle \quad \text{Equation 36}$$

In Equation 36, $|\phi\rangle$ is a quantum state vertical to $|0\rangle$.
A probability amplitude a of the quantum state $|0\rangle$ in Equation 36 is defined as Equation 37.

$$a \equiv \frac{N^2|s_j|^2}{N^2|s_j|^2 + 2\|x\|^2} \quad \text{Equation 37}$$

If a value of Equation 37 is extracted by applying a quantum algorithm (e.g., a QAE algorithm), a value $|s_j|$ of an individual amplitude of the transmission vector is obtained by using a magnitude $\|x\|$ of the transmission vector transferred from a norm extractor (for example, norm extractor 701 in FIG. 7).

A MIMO channel matrix A and a reception vector $y=(y_1 \ldots y_N)^T$ are modified as expressed in Equation 38 for obtaining $|t_j|$.

$$\tilde{A} = \begin{pmatrix} 2i & 0 & \ldots & 0 & -N & 0 & \ldots & 0 & 0 & \ldots & 0 & -N & 0 & \ldots & 0 \\ O_1 & & A & & & & & O_2 & & & & & & & \\ O_1 & & & & & O_2 & & & & & \overline{A} & & & & \end{pmatrix}, \tilde{y} = \begin{pmatrix} 0 \\ y \\ \overline{y} \end{pmatrix} \quad \text{Equation 38}$$

In Equation 38, $O_1$ is a zero matrix of size N×1, and $O_2$ is a zero matrix of size N×N. $\overline{A}$ and $\overline{y}$ are complex conjugate matrixes of A and y, respectively, and $-N$ and N in $\tilde{A}$ are located at the jth column and the N+j th column for $x_j$, respectively. Also, N denotes the number of antennas of a transmission end and a reception end.

A solution $\tilde{x}$ of a linear equation $\tilde{A}\tilde{x}=\tilde{y}$ is expressed as Equation 39.

$$\tilde{x} = (Nt_j x^T \overline{x}^T)^T \quad \text{Equation 39}$$

In Equation 39, $\tilde{x}$ is a complex conjugate matrix of x.

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 40 after $\tilde{x}$ in Equation 39 is normalized.

$$|\tilde{x}\rangle = \frac{Nt_j}{\sqrt{N^2|t_j|^2 + 2\|x\|^2}} |0\rangle + \frac{\sqrt{2}\|x\|}{\sqrt{N^2|t_j|^2 + 2\|x\|^2}} |\phi\rangle \quad \text{Equation 40}$$

In Equation 40, $|\phi\rangle$ is a quantum state vertical to $|0\rangle$.

A probability amplitude a of the quantum state $|0\rangle$ in Equation 40 is defined as Equation 41.

$$a \equiv \frac{N^2|t_j|^2}{N^2|t_j|^2 + 2\|x\|^2} \quad \text{Equation 41}$$

If a value of Equation 41 is extracted by applying a quantum algorithm (e.g., a QAE algorithm), a value $|t_j|$ of an individual amplitude of the transmission vector is obtained by using a magnitude $\|x\|$ of the transmission vector transferred from a norm extractor 701 in FIG. 7.

<QAM Modulation Scheme: Phase Extractor>

For obtaining $s_j$ and $t_j$ which are values of individual amplitudes for each term $x_j=s_j+i \cdot t_j (1 \leq j \leq N)$ of a transmission vector $x=(x_1 \ldots x_N)^T$, different equation modifications are applied.

First, a MIMO channel matrix A and a reception vector $y=(y_1 \ldots y_N)^T$ are modified as expressed in Equation 42 to obtain $s_j$.

$$\tilde{A} = \begin{pmatrix} N^{-1} & & \\ & I_{2N} & \\ & & A' \end{pmatrix}, \tilde{y} = \begin{pmatrix} 1 \\ \mathcal{O} \\ y' \end{pmatrix} \quad \text{Equation 42}$$

In Equation 42, $I_{2N}$ is an identity matrix of size 2N×2N, and $\mathcal{O}$ is a zero matrix of size 2N×1. A' and y' are expressed as Equation 43. Also, N denotes the number of antennas of a transmission end and a reception end.

$$A' = \begin{pmatrix} 2|s_j| & 0 \ldots 0 & -N & 0 \ldots 0 & 0 \ldots 0 & -N & 0 \ldots 0 \\ O_1 & & A & & & O_2 & & \\ O_1 & & & O_2 & & & \overline{A} & \end{pmatrix}, \quad \text{Equation 43}$$

$$y' = \begin{pmatrix} 1 \\ y \\ \overline{y} \end{pmatrix}$$

In Equation 43, $O_1$ is a zero matrix of size N×1, and $O_2$ is a zero matrix of size N×N. $\overline{A}$ and $\overline{y}$ are complex conjugate matrixes of A and y, respectively, and two $-N_s$ in A' are located at the jth column and the N+jth column for $s_j$, respectively.

A solution $\tilde{x}$ of a linear equation $\tilde{A}\tilde{x}=\tilde{y}$ is expressed as Equation 44.

$$\tilde{x} = \left( N\ O^T\ N\frac{s_j}{|s_j|}\ x^T\ \overline{x}^T \right)^T \quad \text{Equation 44}$$

In Equation 44, $\overline{x}$ is a complex conjugate matrix of x.

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 45 after $\tilde{x}$ in Equation 44 is normalized.

$$|\tilde{x}\rangle = \frac{\sqrt{2}\,N}{\sqrt{2N^2 + 2\|x\|^2}} |s_j\rangle |0\rangle + \frac{\sqrt{2}\|x\|}{\sqrt{2N^2 + 2\|x\|^2}} |\phi\rangle \quad \text{Equation 45}$$

In Equation 45, $$|s_j\rangle = \frac{1}{\sqrt{2}} \begin{pmatrix} 1 \\ s_j / |s_j| \end{pmatrix},$$

and $|\phi\rangle$ is a part vertical to $|s_j\rangle|0\rangle$.

In $|\tilde{x}\rangle$ in Equation 45, $|s_j\rangle$ is a part which has information for $s_j/|s_j|$. An amplitude of $|s_j\rangle$ is $$\frac{N^2}{N^2 + \|x\|^2},$$

however, a value of $\|x\|^2$ is about a constant multiple of N, so, through a quantum measurement process, a quantum state $|s_j\rangle$ is obtained approximating to probability 100% as N increases.

Then information for $s_j/|s_j|$ is obtained from the quantum state $|s_j\rangle$. Here, values which $s_j/|s_j|$ may have are ±1, so possible quantum states $|s_j\rangle$s are vertical to each other. In quantum measurement, states which are vertical to each other may be distinguished without an error, a value of $s_j/|s_j|$ is obtained without an error by measuring $|s_j\rangle$.

A value of $s_j$ is obtained by using $|s_j|$ which is a value of an individual amplitude of the transmission vector received from an amplitude extractor 702 in FIG. 7.

Next, a MIMO channel matrix A and a reception vector $y=(y_1 \ldots y_N)^T$ are modified as expressed in Equation 46 for obtaining $t_j$.

$$\tilde{A} = \begin{pmatrix} N^{-1} & & \\ & I_{2N} & \\ & & A' \end{pmatrix}, \tilde{y} = \begin{pmatrix} 1 \\ O \\ y' \end{pmatrix} \quad \text{Equation 46}$$

In Equation 46, $I_{2N}$ is an identity matrix of size 2N×2N, and $O$ is a zero matrix of size 2N×1. Also, N denotes the number of antennas of a transmission end and a reception end. A' and y' are expressed as Equation 47.

$$A' = \begin{pmatrix} 2i|t_j| & 0 \cdots 0 & -N & 0 \cdots 0 & 0 \cdots 0 & N & 0 \cdots 0 \\ O_1 & & A & & & O_2 & \\ O_1 & & O_2 & & & \overline{A} & \end{pmatrix}, \quad \text{Equation 47}$$

$$y' = \begin{pmatrix} 1 \\ y \\ \overline{y} \end{pmatrix}$$

In Equation 47, $O_1$ is a zero matrix of size N×1, and $O_2$ is a zero matrix of size N×N. $\overline{A}$ and $\overline{y}$ are complex conjugate matrixes of A and y, respectively, and −N and N in A' are located at the th column and the N+j th column for $t_j$, respectively.

A solution $\tilde{x}$ of a linear equation $\tilde{A}\tilde{x}=\tilde{y}$ is expressed as Equation 48.

$$\tilde{x} = \left( N \, O^T \, N \frac{t_j}{|t_j|} \, x^T \, \overline{x}^T \right)^T \quad \text{Equation 48}$$

In Equation 48, $\overline{x}$ is a complex conjugate matrix of x.

Meanwhile, due to a characteristic of quantum computing, quantum information is expressed as a vector whose magnitude is normalized to 1. Therefore, a solution $|\tilde{x}\rangle$ of an equation obtained by applying a quantum algorithm is a vector as expressed in Equation 49 after $\tilde{x}$ in Equation 48 is normalized.

$$|\tilde{x}\rangle = \frac{\sqrt{2}\,N}{\sqrt{2N^2 + 2\|x\|^2}} |t_j\rangle|0\rangle + \frac{\sqrt{2}\,\|x\|}{\sqrt{2N^2 + 2\|x\|^2}} |\phi\rangle \quad \text{Equation 49}$$

In Equation 49, $$|t_j\rangle = \frac{1}{\sqrt{2}} \begin{pmatrix} 1 \\ t_j/|t_j| \end{pmatrix},$$

and $|\phi\rangle$ is a part vertical to $|t_j\rangle|0\rangle$.

In $|\tilde{x}\rangle$ in Equation 49, $|t_j\rangle$ is a part which has information for $t_j/|t_j|$. An amplitude of $|t_j\rangle$ is $$\frac{N^2}{N^2 + \|x\|^2},$$

is however, a value of $\|x\|^2$ is a constant multiple of N, so, through a quantum measurement process, a quantum state $|t_j\rangle$ can be obtained, approximating to a probability of 100% as N increases.

Then information for $t_j/|t_j|$ is obtained from the quantum state $|t_j\rangle$. Here, values which $t_j/|t_j|$ may have are ±1, so possible quantum states $|t_j\rangle$s are vertical to each other. In quantum measurement, states which are vertical to each other may be distinguished without an error, a value of $t_j/|t_j|$ is obtained without an error by measuring $|t_j\rangle$.

A value of $t_j$ is obtained by using $|t_j|$ which is a value of an individual amplitude of the transmission vector received from an amplitude extractor (for example, amplitude extractor 702 in FIG. 7).

Figure 12:
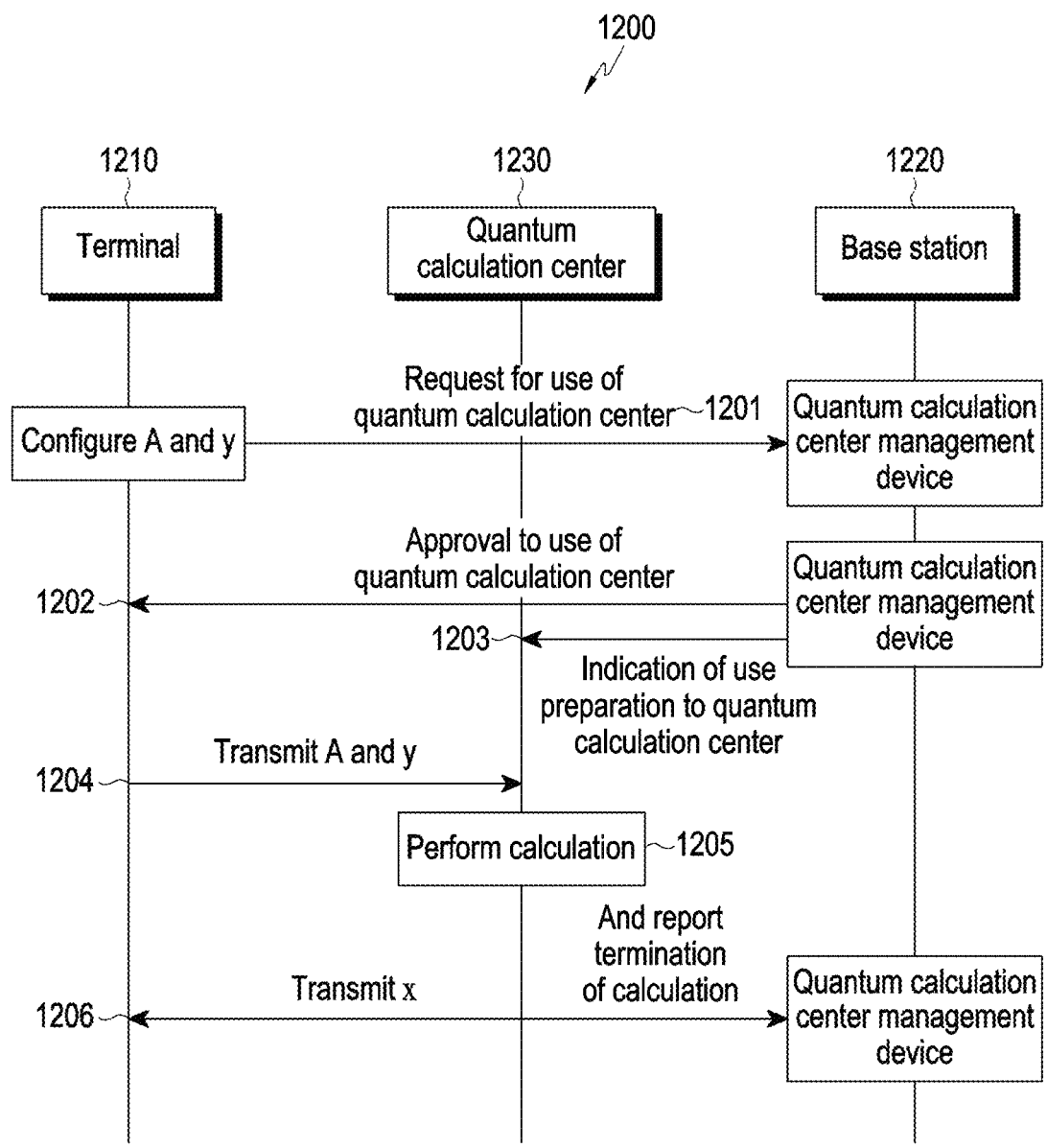
FIG. 12 illustrates, in flowchart format, operations of an example process of using a quantum calculation center where a reception end is a terminal in a MIMO system, according to some embodiments of the present disclosure.

FIG. 12 is a flowchart illustrating operations of an example process of using a quantum calculation center if a reception end is a terminal in a MIMO system, according to some embodiments of the present disclosure.

Referring to the illustrative example of FIG. 12, in operation 1201, a terminal 1210 transmits a message requesting use of a quantum calculation center 1230 to a quantum calculation center management device in a base station 1220. In operation 1202, the quantum calculation center management device in the base station 1220 approves the use of the quantum calculation center 1230 for the terminal 1210 according to a predetermined criteria, and transmits, to the terminal 1210, a message approving the use of the quantum calculation center 1230. In operation 1203, the quantum calculation center management device in the base station 1220 transmits a message indicating use preparation to the quantum calculation center 1230. Here, the message indicating the use preparation includes information on the terminal 1210 requesting the use of the quantum calculation center 1230. In operation 1204, the terminal 1210, which has been approved for use of the quantum calculation center 1230, transmits, to the quantum calculation center 1230, a MIMO channel matrix A and a reception vector y which are targets for quantum calculation. In operation 1205, the quantum calculation center 1230 obtains a transmission vector x, which is an input vector of a MIMO channel by performing quantum calculation according to an embodiment of the present disclosure. In operation 1206, the quantum calculation center 1230 transfers the transmission vector x to the terminal 1210, and transmits a message informing that the quantum calculation is completed to the quantum calculation center management device in the base station 1220.

Meanwhile, a MIMO channel matrix A and a reception vector y used in a quantum calculation center may be transmitted from a device (e.g., a terminal or a base station), which requests calculation from a quantum calculation center, to the quantum calculation center, and an input vector x of a MIMO channel (or a transmission vector) calculated in the quantum calculation center may be transmitted to a designated device as well as the device which requests the calculation from the quantum calculation center. Here, the designated device may be designated by the device which requests the calculation from the quantum calculation center.

In addition, considering practical use, a quantum calculation center may be shared and used by several devices. So, time division multiplexing (TDM), frequency division multiplexing (FDM), and/or the like may be applied by applying a multiplexing technology which may be used by a plurality of users. Accordingly, a device which manages use of the quantum calculation center may transmit and receive time, frequency, and/or the like, which are used resources, to and from, a device which uses the quantum calculation center and the quantum calculation center to transmit A, x, and y.

Figure 13:
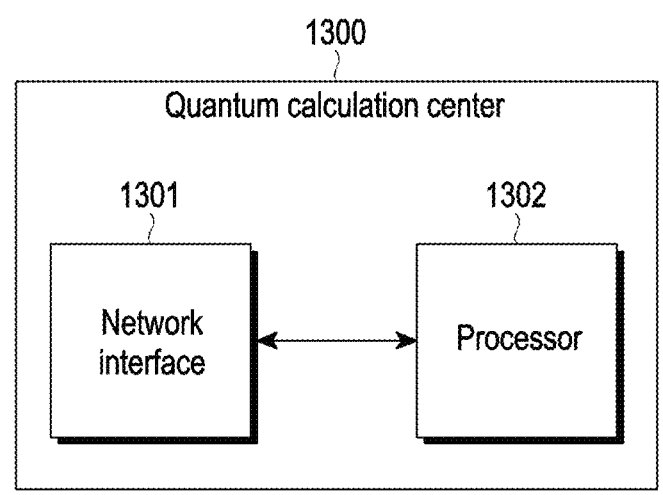
FIG. 13 illustrates, in block diagram format, a structure of a quantum calculation center according to various embodiments of the present disclosure.

FIG. 13 illustrates, in block diagram format, an example of a structure of a quantum calculation center according to various embodiments of the present disclosure.

Referring to the illustrative example of FIG. 13, a quantum calculation center 1300 includes a network interface 1301 and a processor 1302.

The network interface 1301 receives a MIMO channel matrix and a reception vector, and transfers an obtained input vector (or a transmission vector) of the MIMO channel to a reception end.

The processor 1302 performs a role of a linear equation modification module 301, a C/Q converter 302, a QLSS 303, and a Q/C converter 304 in FIG. 3, or a role of a norm extractor 701, an amplitude extractor 702, and a phase extractor 703 in FIG. 7 to perform quantum computing on the received MIMO channel matrix and reception vector and obtain the transmission vector, which is the input vector of the MIMO channel.

Meanwhile, in the explanatory example of FIG. 13, a MIMO system is shown for ease of description. However, it is understood that the present disclosure is not limited thereto and is applicable to a system using a linear equation.

An embodiment of the present disclosure may efficiently process an operation performed in a detection stage in a MIMO system by using a quantum calculation center.

An embodiment of the present disclosure may decrease complexity of a detection stage by modifying a linear equation for detecting an input vector of a MIMO channel in a MIMO system.

An embodiment of the present disclosure may reduce complexity of a process of extracting digital information in an HHL algorithm.

An embodiment of the present disclosure may apply an HHL algorithm to a detection stage in a MIMO system while maintaining performance advantage of the HHL algorithm over an existing digital algorithm as it is.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of detecting a signal in a wireless communication system supporting multiple-input multiple-output (MIMO), the method comprising:
   obtaining a MIMO channel matrix between a transmission end and a reception end and a reception vector received by the reception end;
   identifying a modulation scheme of the transmission end;
   applying a preset equation modification scheme to the MIMO channel matrix and the reception vector according to the identified modulation scheme; and
   detecting a transmission vector of the transmission end by performing quantum calculation on the modified MIMO channel matrix and the modified reception vector.

2. The method of claim 1, wherein the modulation scheme is one of a binary phase shift keying (BPSK) modulation scheme, a quadrature phase shift keying (QPSK) modulation scheme, an M-ary phase shift keying (MPSK) modulation scheme, or a quadrature amplitude modulation (QAM) modulation scheme, and
   wherein, M is a power of 2 which is equal to or greater than 2.

3. The method of claim 2, wherein, when the modulation scheme is the MPSK modulation scheme, the modified MIMO channel matrix and the modified reception vector are modified by using the preset equation modification scheme, wherein the preset equation modification scheme is expressed as:

$$\tilde{A} = \begin{pmatrix} I_N & & & \\ O & A & & \\ & Y & A & \\ & & \ddots & \ddots \\ & & & Y & A \end{pmatrix} \begin{pmatrix} \Omega & & & \\ & \Omega & & \\ & & \ddots & \\ & & & \Omega & \\ & & & & \Omega \end{pmatrix},$$

$$\tilde{y} = \begin{pmatrix} J \\ y \\ 0 \\ \vdots \\ 0 \end{pmatrix}$$

where, A denotes the MIMO channel matrix, $y=(y_1 \ldots y_N)^T$ denotes the reception vector, N denotes a number of antennas of the transmission end and the reception end, O denotes a zero matrix of size N×N, Y denotes an N×N matrix in which only a jth column is $-y$, $\Omega=\text{diag}(1, N^{-1}, 1, \ldots, 1)$ denotes an N×N diagonal matrix in which a jth column is $N^{-1}$, $I_N$ denotes an identity matrix of size N×N, $J=(1 \ldots 1)^T$, $\tilde{A}$ denotes a matrix of size MN×MN and $\tilde{y}$ denotes a column vector of length MN.

4. The method of claim 2, wherein, if the modulation scheme is the QAM modulation scheme, performing the quantum calculation on the modified MIMO channel matrix and reception vector comprises:
   performing the quantum calculation on the modified MIMO channel matrix and the modified reception vector to obtain prior information related to the transmission vector; and
   detecting the transmission vector based on the prior information, and
   wherein the prior information includes at least one of a magnitude of the transmission vector, a magnitude of an individual component of the transmission vector, and a phase of the individual component of the transmission vector.

5. The method of claim 4, wherein the modified MIMO channel and the modified reception vector, are modified by using the preset equation modification scheme for obtaining the magnitude of the transmission vector included in the prior information, are expressed as:

$$\tilde{A} = \begin{pmatrix} 1 & O_1 \\ O_2 & A \end{pmatrix}, \tilde{y} = \begin{pmatrix} N \\ y_1 \\ \vdots \\ y_N \end{pmatrix}$$

where, A denotes the MIMO channel matrix, $y=(y_1 \ldots y_N)^T$ denotes the reception vector, N denotes a number of antennas of the transmission end and the reception end, $O_1$ denotes a zero matrix of size 1×N, and $O_2$ denotes a zero matrix of size N×1.

6. The method of claim 4, wherein the modified MIMO channel and the modified reception vector, are modified by using the preset equation modification scheme for obtaining the magnitude of the individual component of the transmission vector included in the prior information, and the modified MIMO channel and the modified reception vector are used to obtain a magnitude of a real part component of the transmission vector, wherein the modified MIMO channel and the modified reception vector are expressed as:

$$\tilde{A} = \begin{pmatrix} 2 & 0...0 & -N & 0...0 & 0...0 & -N & 0...0 \\ O_1 & & A & & & O_2 & \\ O_1 & & O_2 & & & \overline{A} & \end{pmatrix}, \tilde{y} = \begin{pmatrix} 0 \\ y \\ \overline{y} \end{pmatrix}$$

where, A denotes the MIMO channel matrix, $y=(y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and two –N s in $\tilde{A}$ are located at a jth column and an N+j$_{th}$ column for $x_j$, respectively.

7. The method of claim 4, wherein the modified MIMO channel and the modified reception vector, which are modified by using the preset equation modification scheme for obtaining the magnitude of the individual component of the transmission vector included in the prior information, and the modified MIMO channel and the modified reception vector are used to obtain a magnitude of an imaginary part component of the transmission vector, and wherein the modified MIMO channel and the modified reception vector are expressed as:

$$\tilde{A} = \begin{pmatrix} 2i & 0...0 & -N & 0...0 & 0...0 & N & 0...0 \\ O_1 & & A & & & O_2 & \\ O_1 & & O_2 & & & \overline{A} & \end{pmatrix}, \tilde{y} = \begin{pmatrix} 0 \\ y \\ \overline{y} \end{pmatrix}$$

where, A denotes the MIMO channel matrix, $y=(y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and –N and N in $\tilde{A}$ are located at a jth column and an N+j$_{th}$ column for $x_j$, respectively.

8. The method of claim 4, wherein the modified MIMO channel and the modified reception vector, which are modified by using the preset equation modification scheme for obtaining the phase of the individual component of the transmission vector included in the prior information, and the modified MIMO channel and the modified reception vector are used to obtain a sign of a real part component of the transmission vector, and wherein the modified MIMO channel and the modified reception vector are expressed as:

$$\tilde{A} = \begin{pmatrix} N^{-1} & & \\ & I_{2N} & \\ & & A' \end{pmatrix}, \tilde{y} = \begin{pmatrix} 1 \\ O \\ y' \end{pmatrix}$$

where, $I_{2N}$ denotes an identify matrix of size 2N×2N, O denotes a zero matrix of size 2N×1, A' and y' denote $$A' = \begin{pmatrix} 2|s_j| & 0...0 & -N & 0...0 & 0...0 & -N & 0...0 \\ O_1 & & A & & & O_2 & \\ O_1 & & O_2 & & & \overline{A} & \end{pmatrix}, y' = \begin{pmatrix} 1 \\ y \\ \overline{y} \end{pmatrix}$$

, respectively, A denotes the MIMO channel matrix, $y=(y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and two –N s in A' are located at a jth column and an N+j$_{th}$ column for $S_j$, respectively.

9. The method of claim 4, wherein the modified MIMO channel and the modified reception vector, which are modified by using the preset equation modification scheme for obtaining the phase of the individual component of the transmission vector included in the prior information, and the modified MIMO channel and the modified reception vector are used to obtain a sign of an imaginary part component of the transmission vector, and wherein the modified MIMO channel and the modified reception vector are expressed as:

$$\tilde{A} = \begin{pmatrix} N^{-1} & & \\ & I_{2N} & \\ & & A' \end{pmatrix}, \tilde{y} = \begin{pmatrix} 1 \\ O \\ y' \end{pmatrix}$$

where, $I_{2N}$ denotes an identify matrix of size 2N×2N, O denotes a zero matrix of size 2N×1, A' and y' denote $$A' = \begin{pmatrix} 2i|t_j| & 0...0 & -N & 0...0 & 0...0 & N & 0...0 \\ O_1 & & A & & & O_2 & \\ O_1 & & O_2 & & & \overline{A} & \end{pmatrix}, y' = \begin{pmatrix} 1 \\ y \\ \overline{y} \end{pmatrix},$$

respectively, A denotes the MIMO channel matrix, $y=(y_1 \ldots y_N)^T$ denotes the reception vector, N denotes a number of antennas of the transmission end and the reception end,) $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and –N and N in A' are located at a jth column and an N+j$_{th}$ column for $t_j$, respectively.

10. The method of claim 1, wherein performing the quantum calculation on the modified MIMO channel matrix and reception vector comprises:
   quantizing the modified MIMO channel matrix and reception vector;
   applying a quantum algorithm to the quantized MIMO channel matrix and reception vector; and
   detecting the transmission vector by digitizing a result of applying the quantum algorithm.

11. A quantum calculation center in a wireless communication system supporting multiple-input multiple-output (MIMO), the quantum calculation center comprising:
   a network interface configured to obtain a MIMO channel matrix between a transmission end and a reception end and a reception vector received by the reception end; and
   a processor configured to:
      identify a modulation scheme of the transmission end,
      apply a preset equation modification scheme to the MIMO channel matrix and the reception vector according to the identified modulation scheme, and
      detect a transmission vector of the transmission end by performing quantum calculation on the modified MIMO channel matrix and the modified reception vector.

12. The quantum calculation center of claim 11, wherein the modulation scheme is one of a binary phase shift keying (BPSK) modulation scheme, a quadrature phase shift keying (QPSK) modulation scheme, an M-ary phase shift keying (MPSK) modulation scheme, or a quadrature amplitude modulation (QAM) modulation scheme.

13. The quantum calculation center of claim 12, wherein, when the modulation scheme is the MPSK modulation scheme, the modified MIMO channel matrix and the modified reception vector which are modified by using the preset equation modification scheme are expressed as a following equation, $$\tilde{A} = \begin{pmatrix} I_N & & & \\ O & A & & \\ & Y & A & \\ & & \ddots & \ddots \\ & & & Y & A \end{pmatrix} \begin{pmatrix} \Omega & & & \\ & \Omega & & \\ & & \ddots & \\ & & & \Omega \end{pmatrix}, \tilde{y} = \begin{pmatrix} J \\ y \\ 0 \\ \vdots \\ 0 \end{pmatrix}$$

where, A denotes the MIMO channel matrix, $y = (y_1 \ldots y_N)^T$ denotes the reception vector, N denotes a number of antennas of the transmission end and the reception end, O denotes a zero matrix of size N×N, Y denotes an N×N matrix in which only a jth column is $-y$, $\Omega = \text{diag}(1, \ldots, 1, N^{-1}, 1, \ldots, 1)$ denotes an N×N diagonal matrix in which a jth column is $N^{-1}$, $I_N$ denotes an identity matrix of size N×N, $J = (1 \ldots 1)^T$, $\tilde{A}$ denotes a matrix of size MN×MN, and $\tilde{y}$ denotes a column vector whose length is MN.

14. The quantum calculation center of claim 12, wherein, if the modulation scheme is the QAM modulation scheme, the processor is configured to:
perform the quantum calculation on the modified MIMO channel matrix and the modified reception vector to obtain prior information related to the transmission vector, and
detect the transmission vector based on the prior information, and
wherein the prior information includes at least one of a magnitude of the transmission vector, a magnitude of an individual component of the transmission vector, and a phase of the individual component of the transmission vector.

15. The quantum calculation center of claim 14, wherein the modified MIMO channel and the modified reception vector are modified by using the preset equation modification scheme for obtaining the magnitude of the transmission vector included in the prior information, and wherein the modified MIMO channel and the modified reception vector are expressed as:

$$\tilde{A} = \begin{pmatrix} 1 & O_1 \\ O_2 & A \end{pmatrix}, \tilde{y} = \begin{pmatrix} N \\ y_1 \\ \vdots \\ y_N \end{pmatrix}$$

where, A denotes the MIMO channel matrix, $y = (y_1 \ldots y_N)^T$ denotes the reception vector, N denotes a number of antennas of the transmission end and the reception end, $O_1$ denotes a zero matrix of size 1×N, $O_2$ denotes a zero matrix of size N×1.

16. The quantum calculation center of claim 14, wherein the modified MIMO channel and the modified reception vector are modified by using the preset equation modification scheme for obtaining the magnitude of the individual component of the transmission vector included in the prior information, the modified MIMO channel and the modified reception vector are used to obtain a magnitude of a real part component of the transmission vector, and wherein the modified MIMO channel and the modified reception vector are expressed as:

$$\tilde{A} = \begin{pmatrix} 2 & 0\ldots0 & -N & 0\ldots0 & 0\ldots0 & -N & 0\ldots0 \\ O_1 & & A & & & O_2 & \\ O_1 & & O_2 & & & \overline{A} & \end{pmatrix}, \tilde{y} = \begin{pmatrix} 0 \\ y \\ \overline{y} \end{pmatrix}$$

where, A denotes the MIMO channel matrix, $y = (y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and two $-N$ s in $\tilde{A}$ are located at a jth column and an $N+j_{th}$ column for $x_j$, respectively.

17. The quantum calculation center of claim 14, wherein the modified MIMO channel and the modified reception vector are modified by using the preset equation modification scheme for obtaining the magnitude of the individual component of the transmission vector included in the prior information, and the modified MIMO channel and the modified reception vector are used to obtain a magnitude of an imaginary part component of the transmission vector, and wherein the modified MIMO channel and the modified reception vector are expressed as:

$$\tilde{A} = \begin{pmatrix} 2i & 0\ldots0 & -N & 0\ldots0 & 0\ldots0 & -N & 0\ldots0 \\ O_1 & & A & & & O_2 & \\ O_1 & & O_2 & & & \overline{A} & \end{pmatrix}, \tilde{y} = \begin{pmatrix} 0 \\ y \\ \overline{y} \end{pmatrix}$$

where, A denotes the MIMO channel matrix, $y = (y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and $-N$ and N in $\tilde{A}$ are located at a jth column and an $N+j_{th}$ column for $x_j$, respectively.

18. The quantum calculation center of claim 14, wherein the modified MIMO channel and the modified reception vector are modified by using the preset equation modification scheme for obtaining the phase of the individual component of the transmission vector included in the prior information, the modified MIMO channel and the modified reception vector are used to obtain a sign of a real part component of the transmission vector, and wherein the modified MIMO channel and the modified reception vector are expressed as:

$$\tilde{A} = \begin{pmatrix} N^{-1} & & \\ & I_{2N} & \\ & & A' \end{pmatrix}, \tilde{y} = \begin{pmatrix} 1 \\ O \\ y' \end{pmatrix}$$

where, $I_{2N}$ denotes an identify matrix of size 2N×2N, O denotes a zero matrix of size 2N×1, A' and y' denote $$A' = \begin{pmatrix} 2|s_j| & 0...0 & -N & 0...0 & 0...0 & -N & 0...0 \\ O_1 & & A & & & O_2 & \\ O_1 & & O_2 & & & \overline{A} & \end{pmatrix}, y' = \begin{pmatrix} 1 \\ y \\ \overline{y} \end{pmatrix},$$

, respectively, A denotes the MIMO channel matrix, $y=(y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and two −N s in A' are located at a jth column and an $N+j_{\_th}$ column for $S_j$, respectively.

19. The quantum calculation center of claim 14, wherein the modified MIMO channel and the modified reception vector are modified by using the preset equation modification scheme for obtaining the phase of the individual component of the transmission vector included in the prior information, the modified MIMO channel and the modified reception vector are used to obtain a sign of an imaginary part component of the transmission vector, and wherein the modified MIMO channel and the modified reception vector are expressed as:

$$\tilde{A} = \begin{pmatrix} N^{-1} & & \\ & I_{2N} & \\ & & A' \end{pmatrix}, \tilde{y} = \begin{pmatrix} 1 \\ O \\ y' \end{pmatrix}$$

where, $I_{2N}$ denotes an identify matrix of size 2N×2N, O denotes a zero matrix of size 2N×1, A' and y' denote $$A' = \begin{pmatrix} 2i|t_j| & 0...0 & -N & 0...0 & 0...0 & N & 0...0 \\ O_1 & & A & & & O_2 & \\ O_1 & & O_2 & & & \overline{A} & \end{pmatrix}, y' = \begin{pmatrix} 1 \\ y \\ \overline{y} \end{pmatrix},$$

respectively, A denotes the MIMO channel matrix, $y=(y_1 \ldots y_N)^T$ denotes the reception vector, N denotes a number of antennas of the transmission end and the reception end, $O_1$ denotes a zero matrix of size N×1, $O_2$ denotes a zero matrix of size N×N, $\overline{A}$ and $\overline{y}$ denote a complex conjugate matrix of A and a complex conjugate matrix of y, respectively, and −N and N in A' are located at a jth column and an $N+j_{\_th}$ column for $t_j$, respectively.

20. The quantum calculation center of claim 11, wherein the processor is configured to:
   quantize the modified MIMO channel matrix and reception vector,
   apply a quantum algorithm to the quantized MIMO channel matrix and reception vector, and
   detect the transmission vector by digitizing a result of applying the quantum algorithm.

\* \* \* \* \*